March 27, 1934. G. V. ANDERSON 1,952,231
MILLING MACHINE
Filed Oct. 20, 1931 20 Sheets-Sheet 3

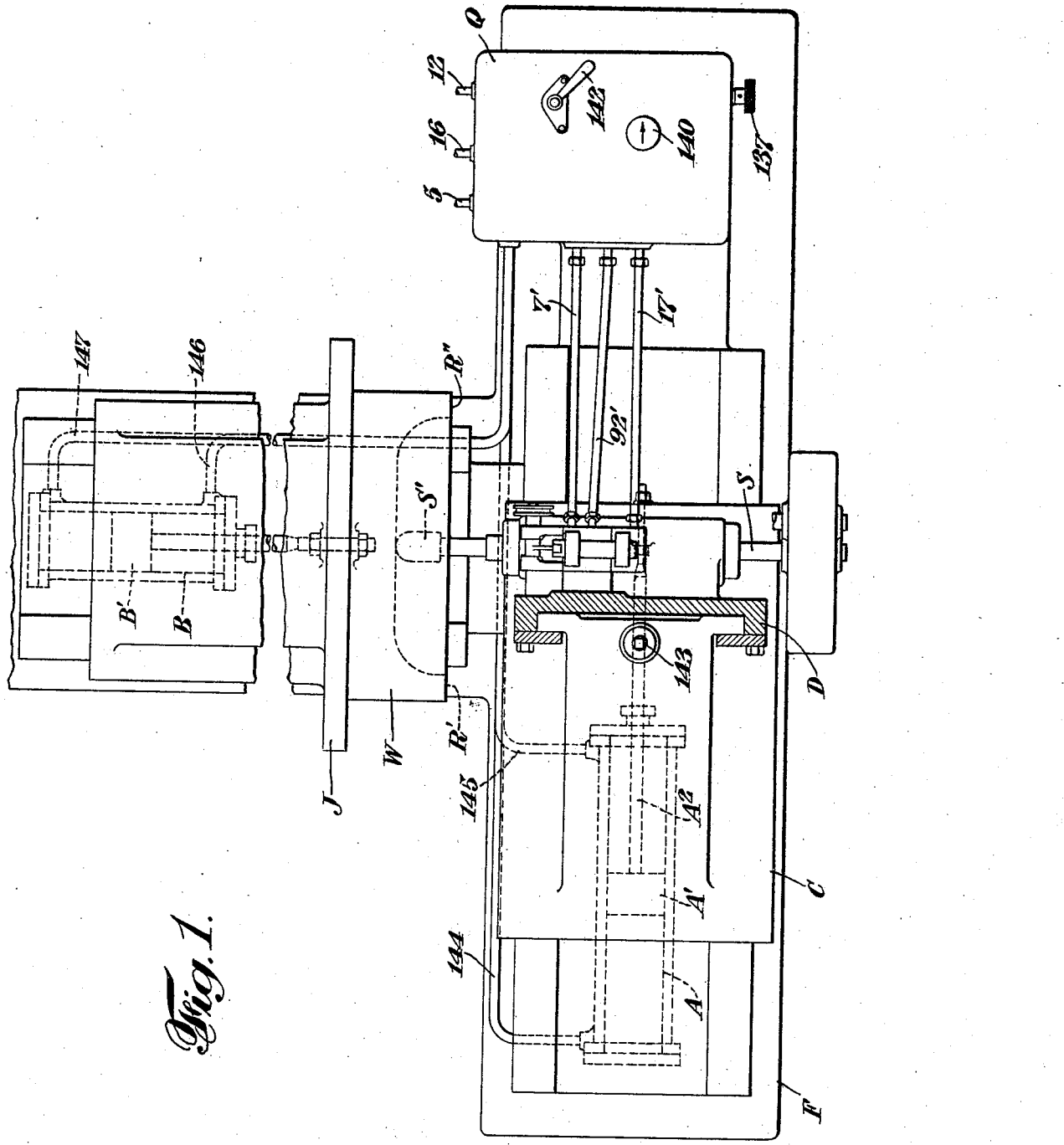

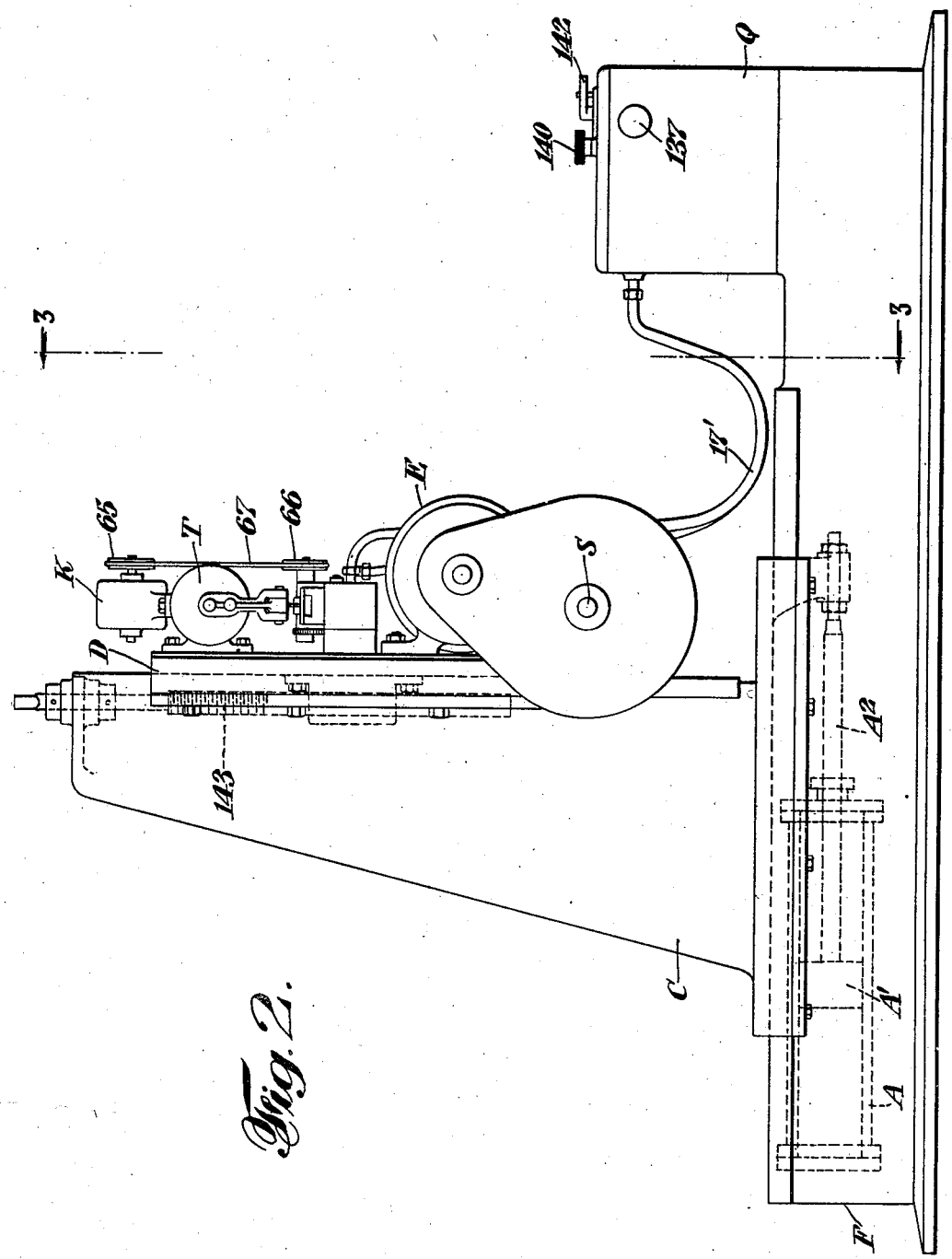

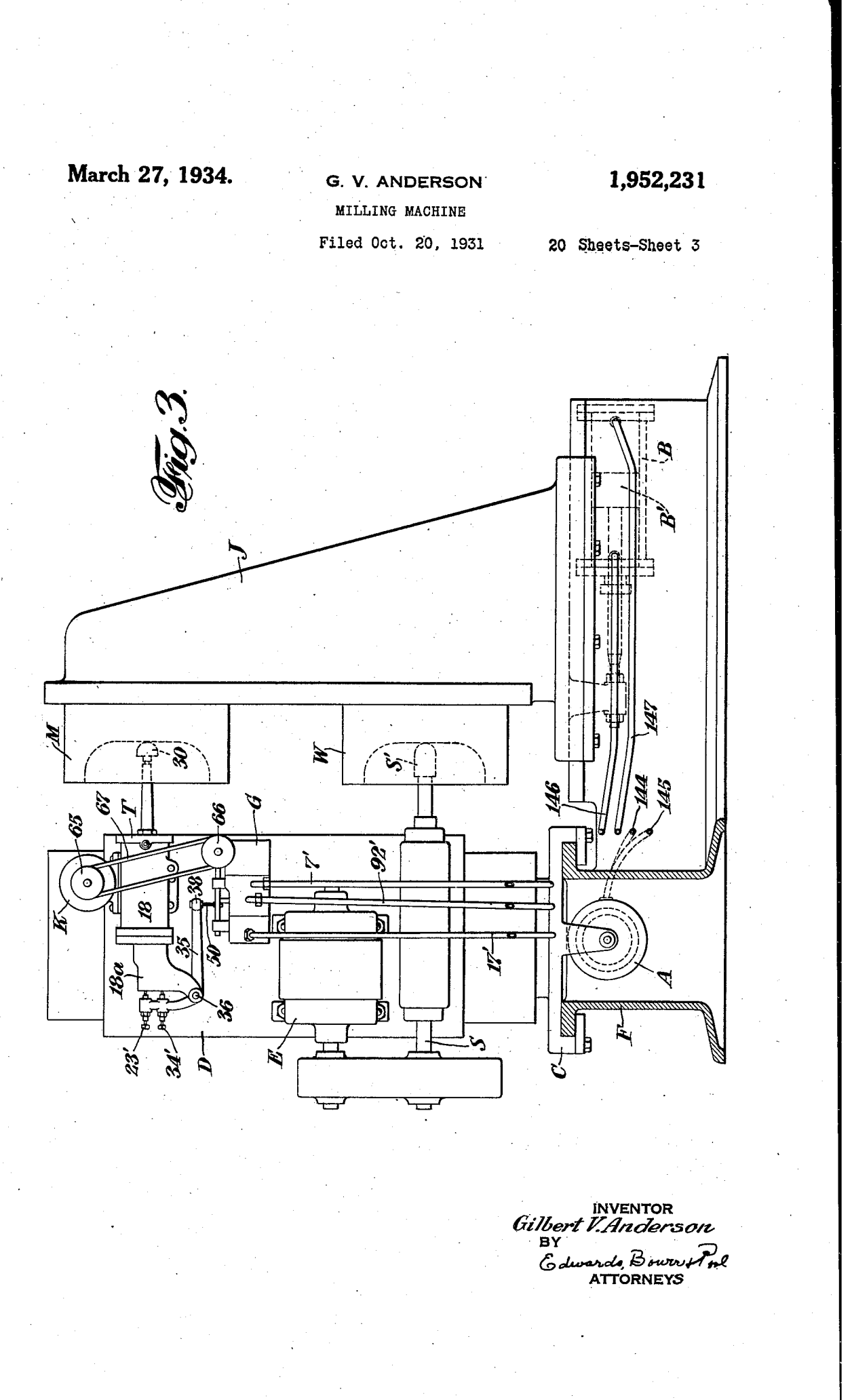

INVENTOR
Gilbert V. Anderson
BY
Edwards, Bowers Pool
ATTORNEYS

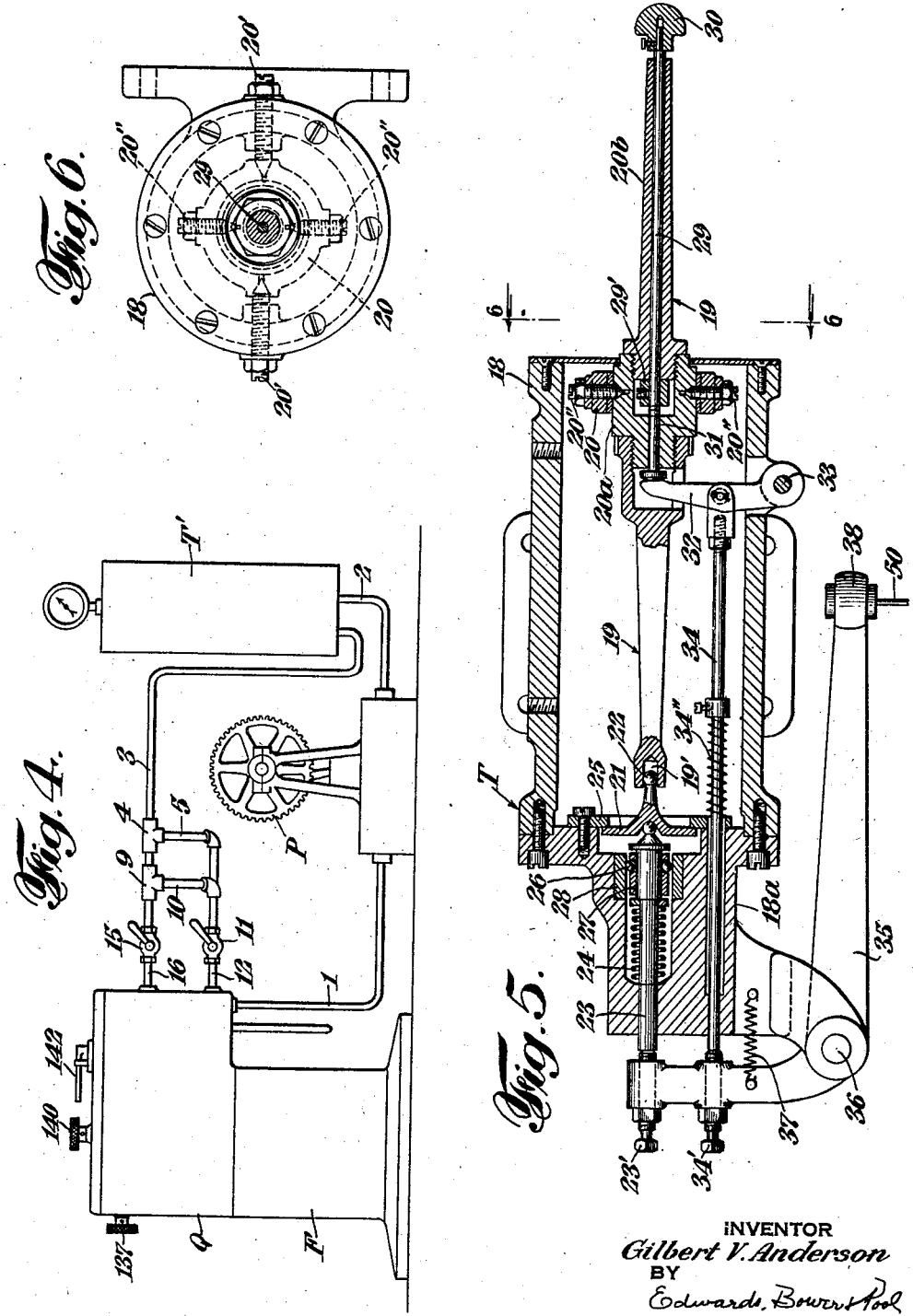

March 27, 1934.  G. V. ANDERSON  1,952,231
MILLING MACHINE
Filed Oct. 20, 1931   20 Sheets-Sheet 5
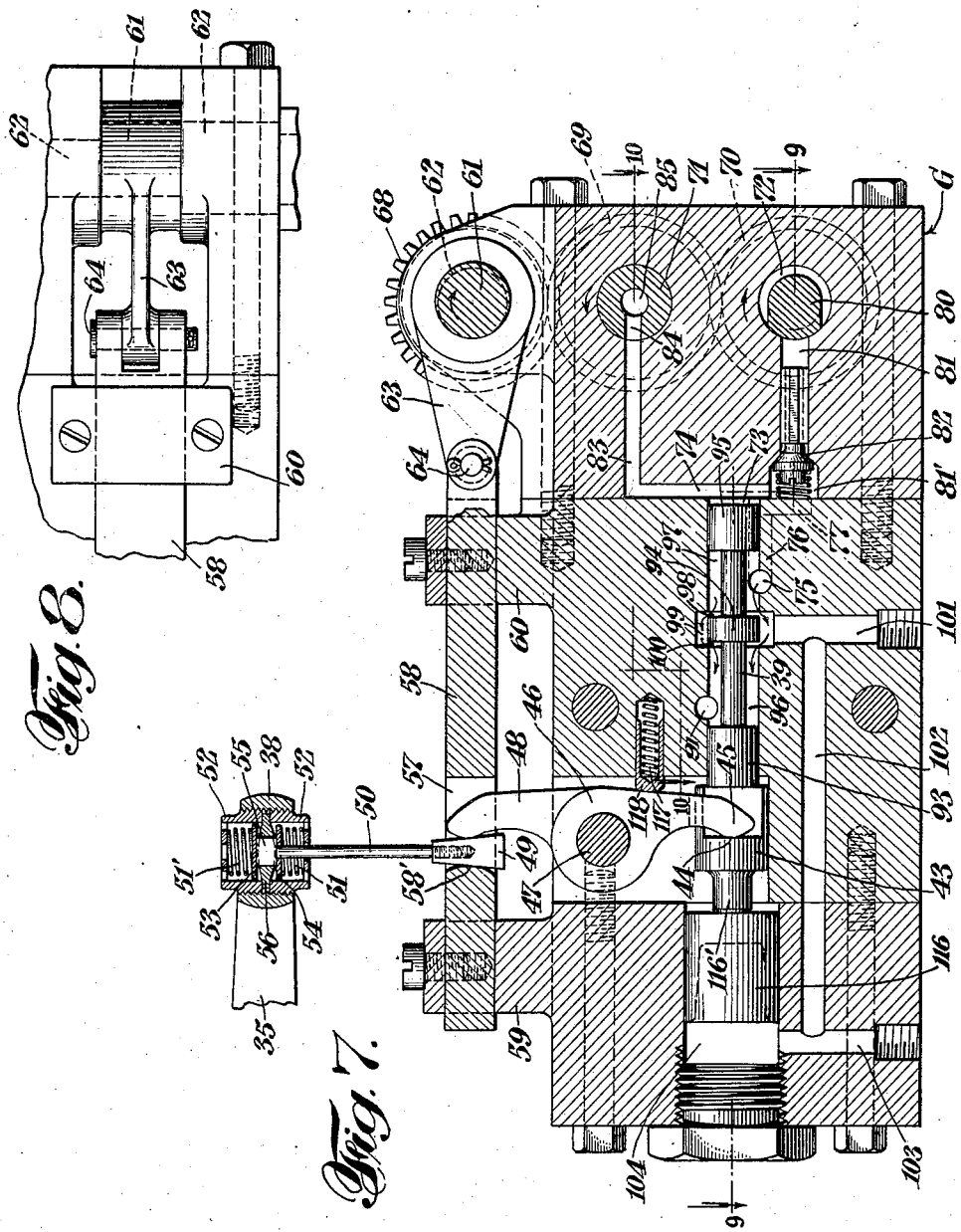
INVENTOR
*Gilbert V. Anderson*
BY
*Edwards, Bower & Pool*
ATTORNEYS March 27, 1934.  G. V. ANDERSON  1,952,231
MILLING MACHINE
Filed Oct. 20, 1931   20 Sheets-Sheet 6
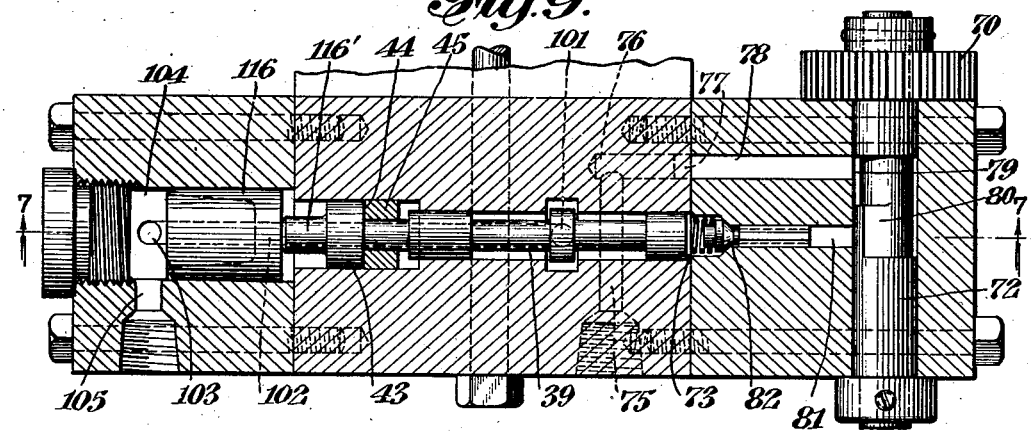
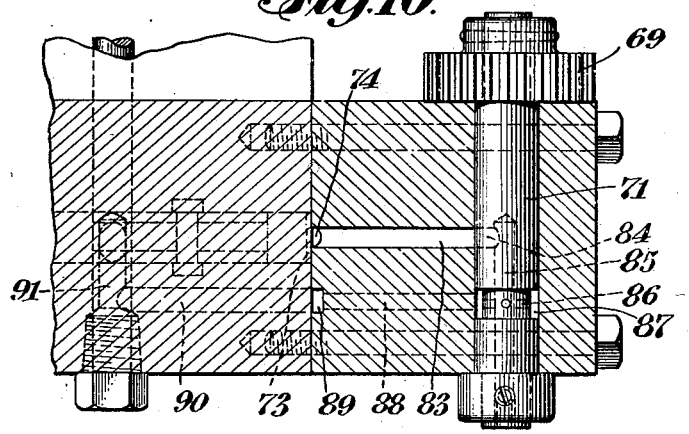
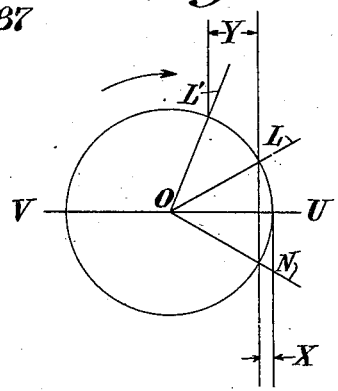
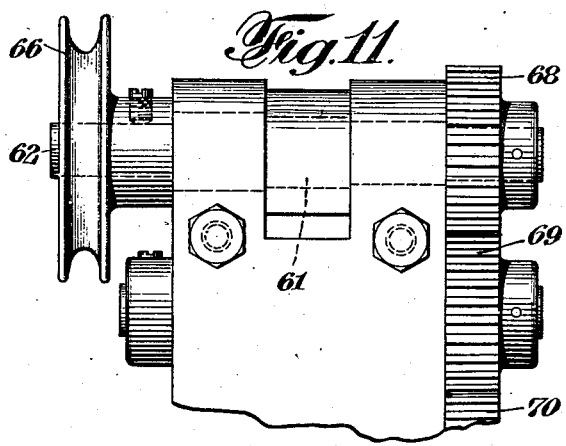
INVENTOR
*Gilbert V. Anderson*
BY
*Edwards, Bower, Pool*
ATTORNEYS

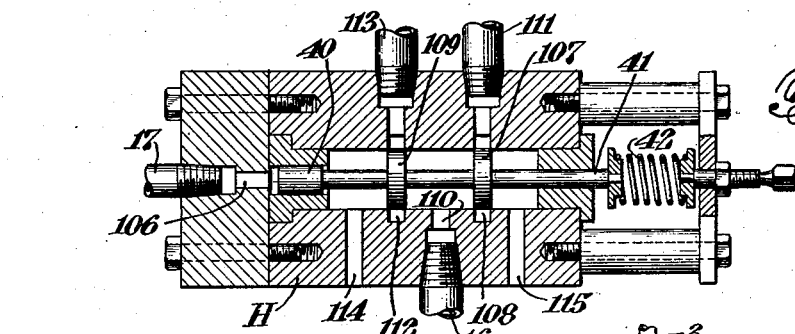
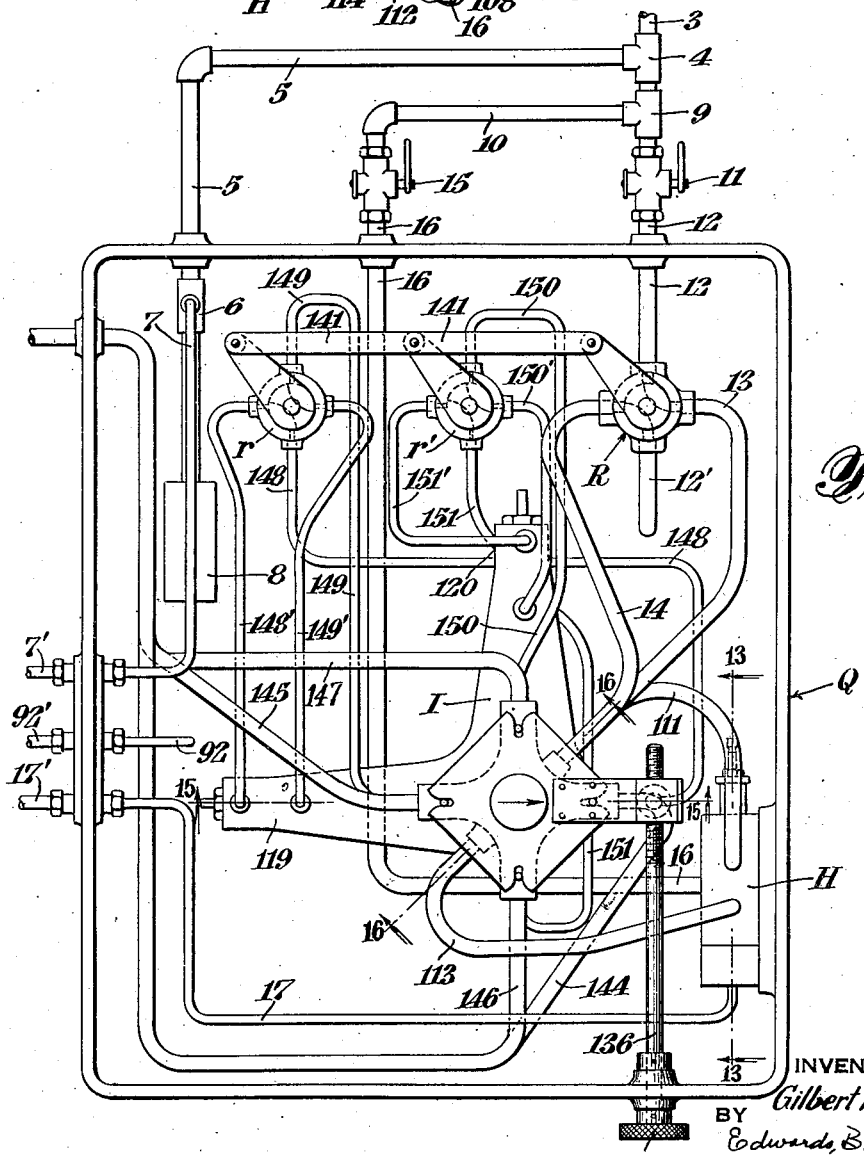

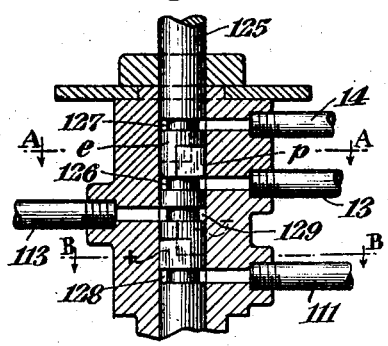
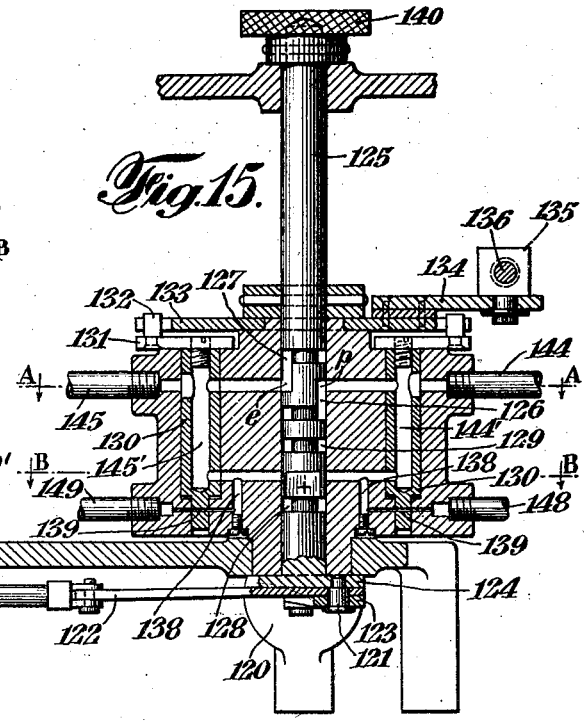
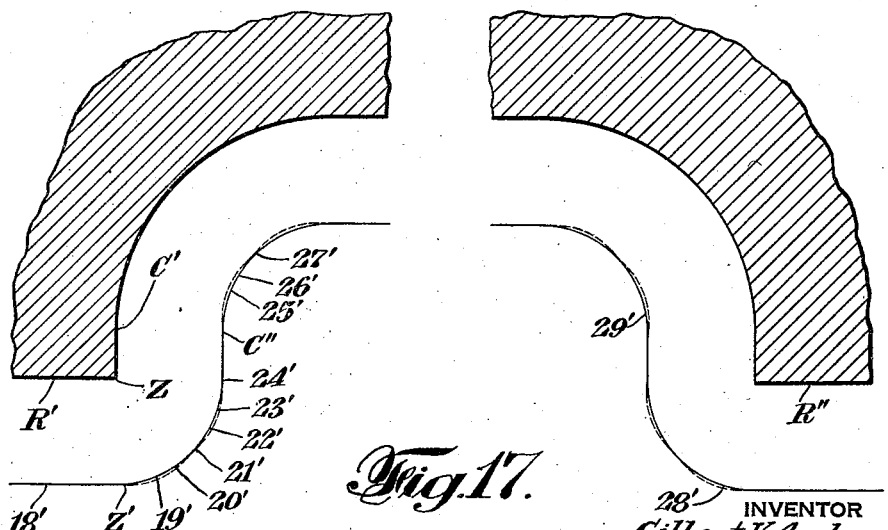

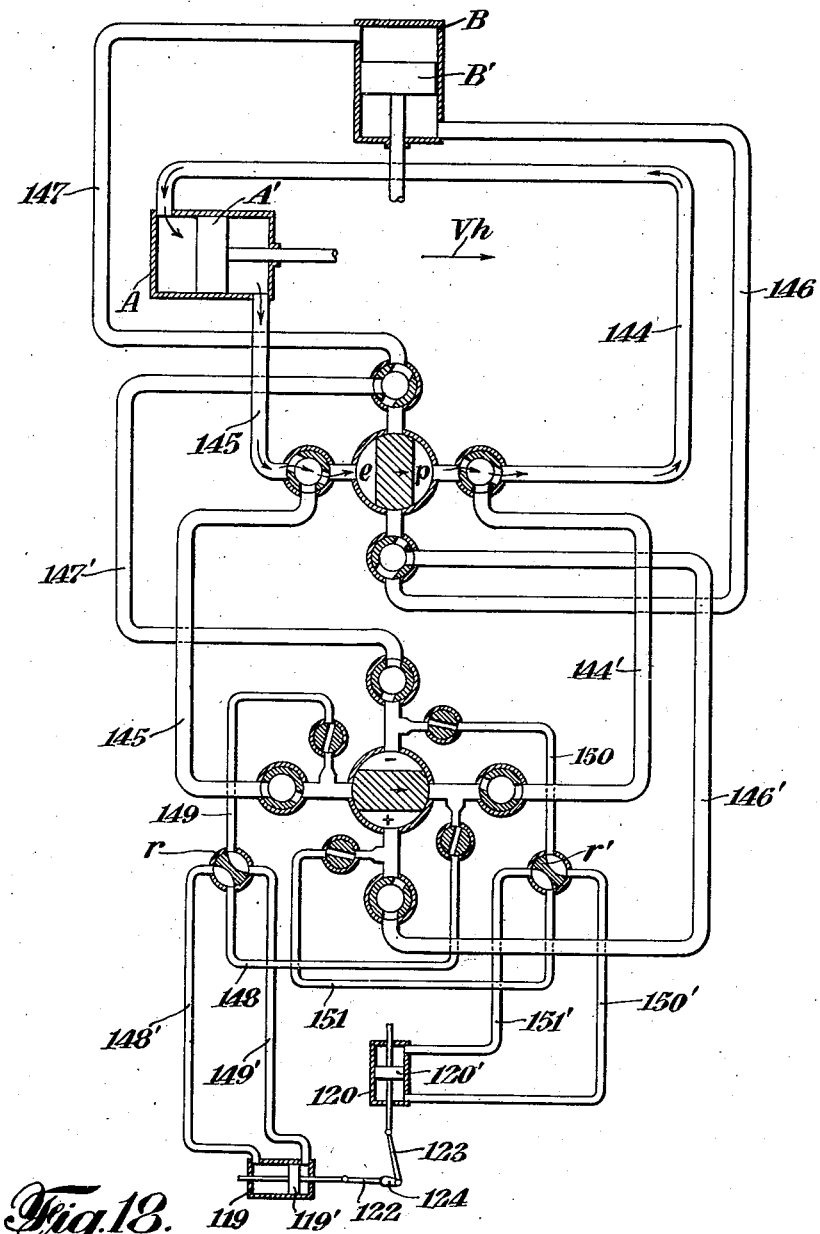
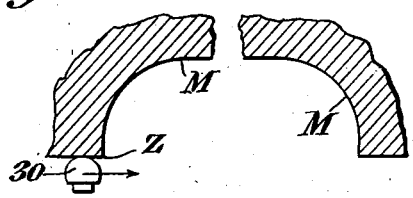
Fig. 13.

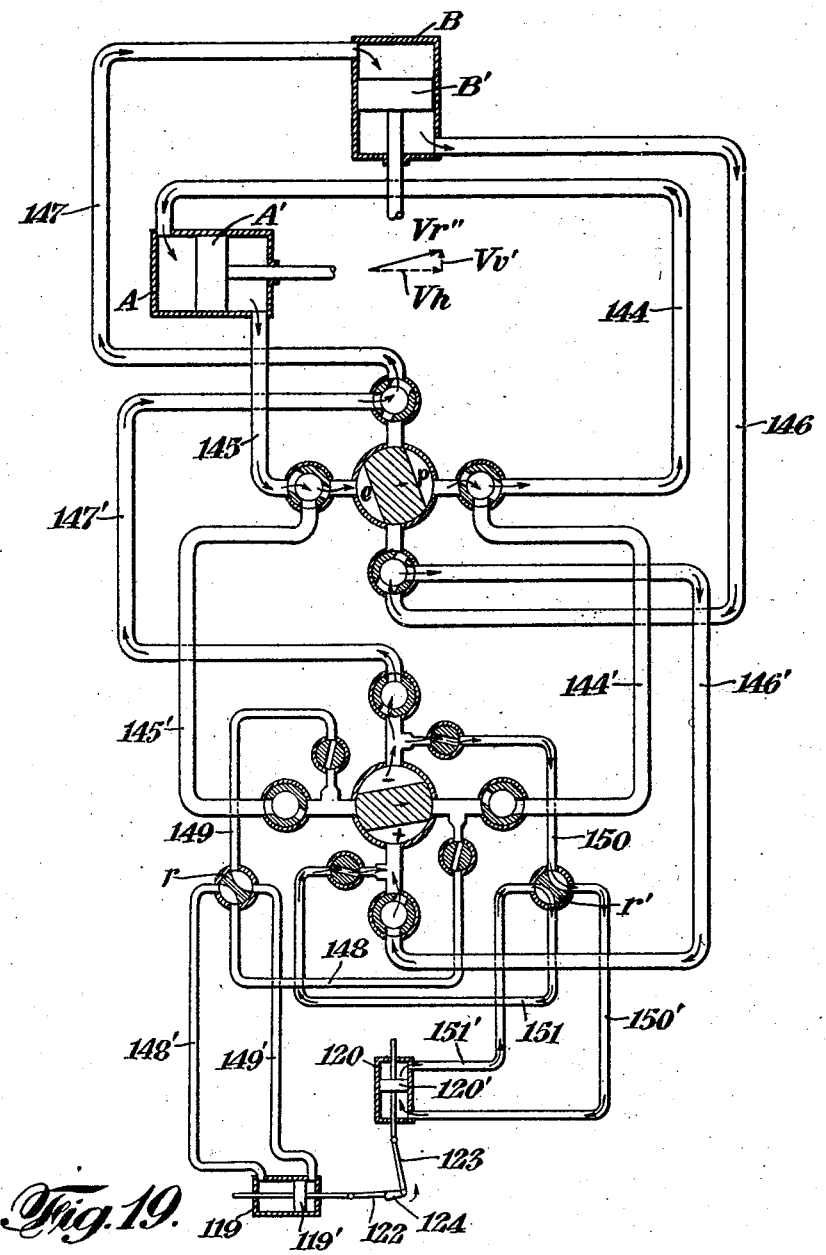
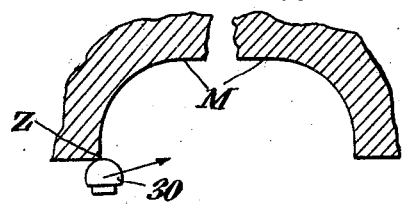
Fig. 19.

March 27, 1934.    G. V. ANDERSON    1,952,231
MILLING MACHINE
Filed Oct. 20, 1931    20 Sheets-Sheet 11
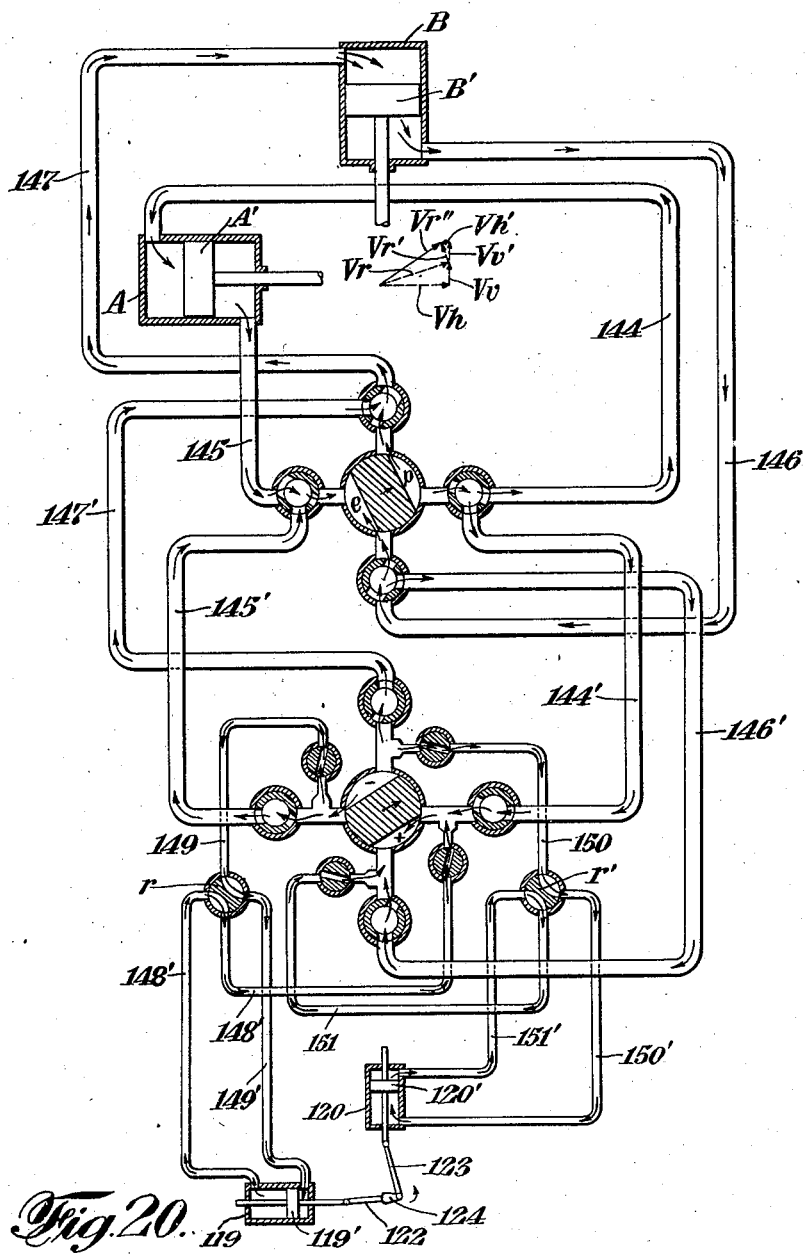
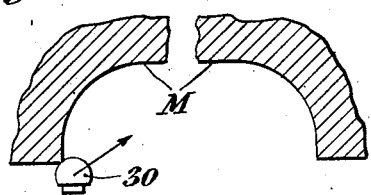
Fig. 20.
INVENTOR
Gilbert V. Anderson
BY
Edwards, Bower & Pook
ATTORNEYS

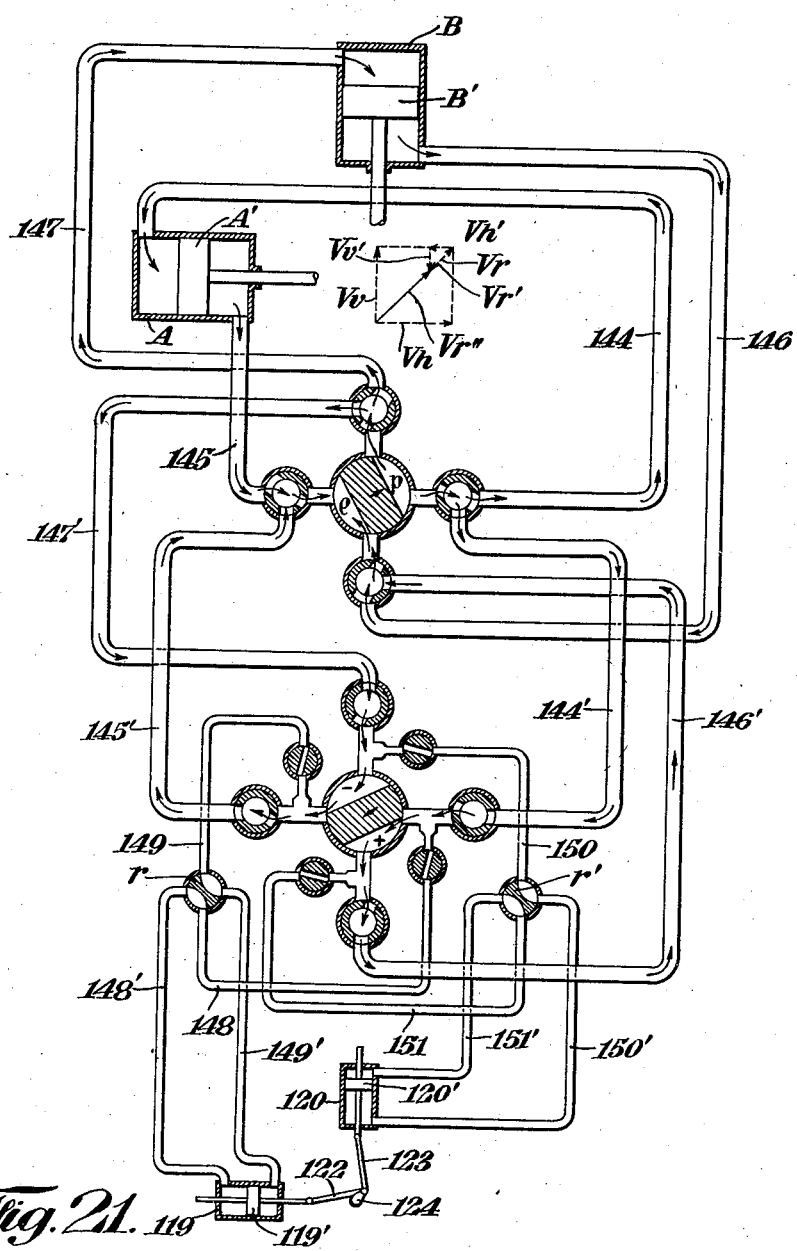
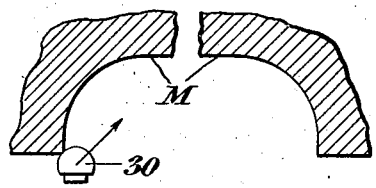

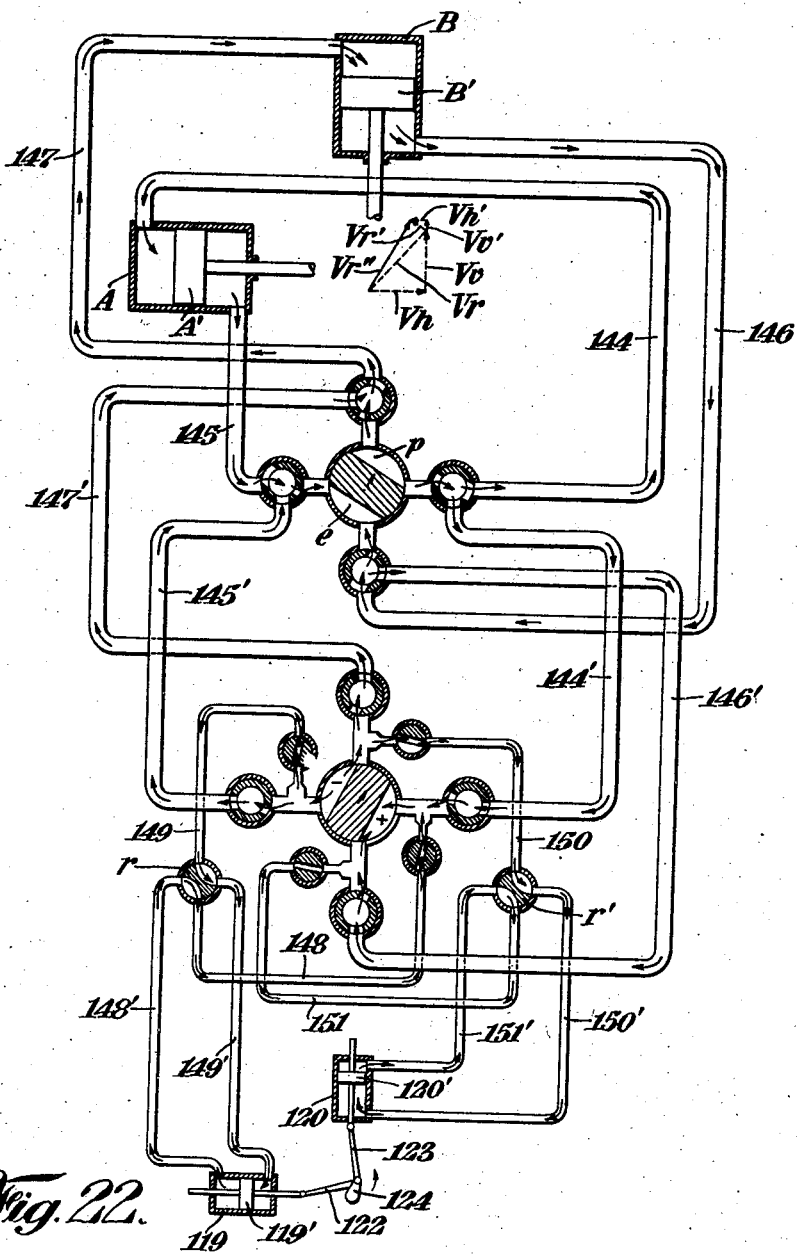
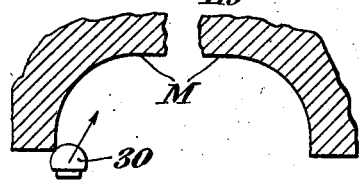

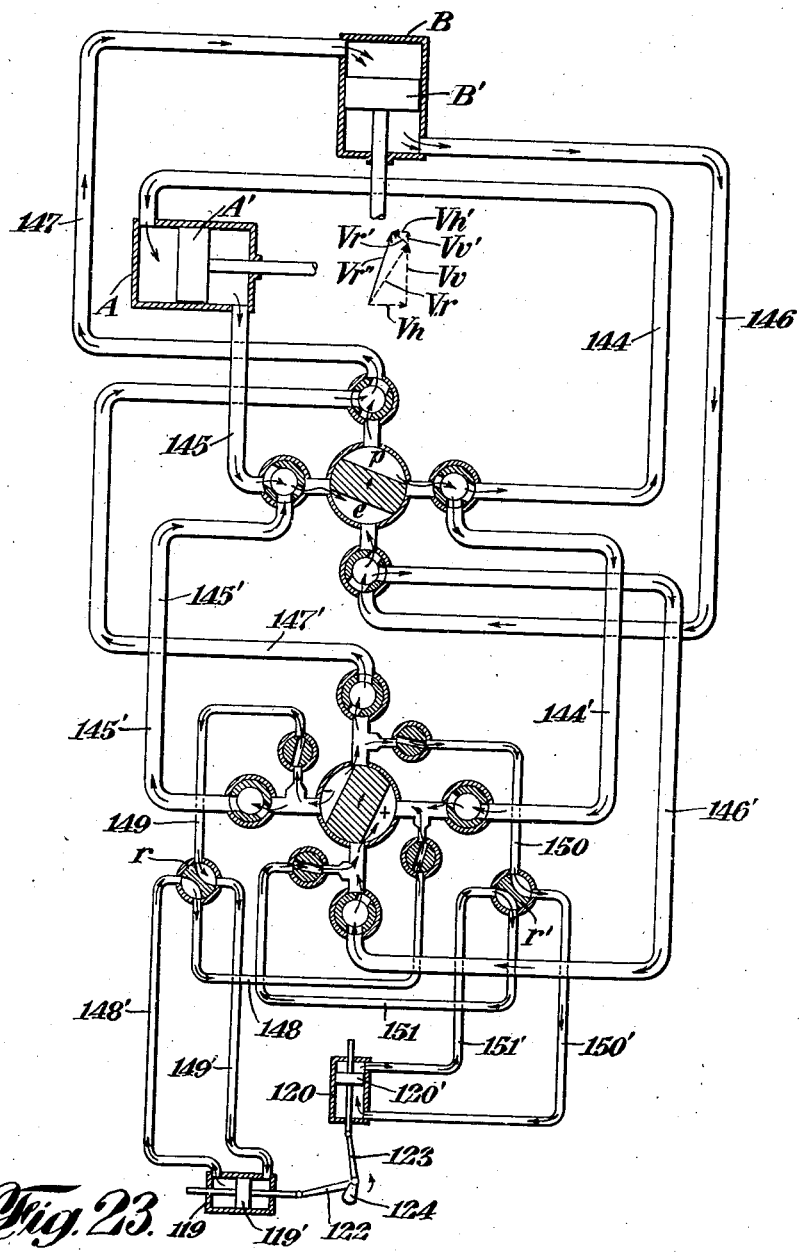
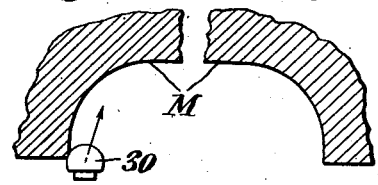

March 27, 1934.  G. V. ANDERSON  1,952,231
MILLING MACHINE
Filed Oct. 20, 1931  20 Sheets-Sheet 15
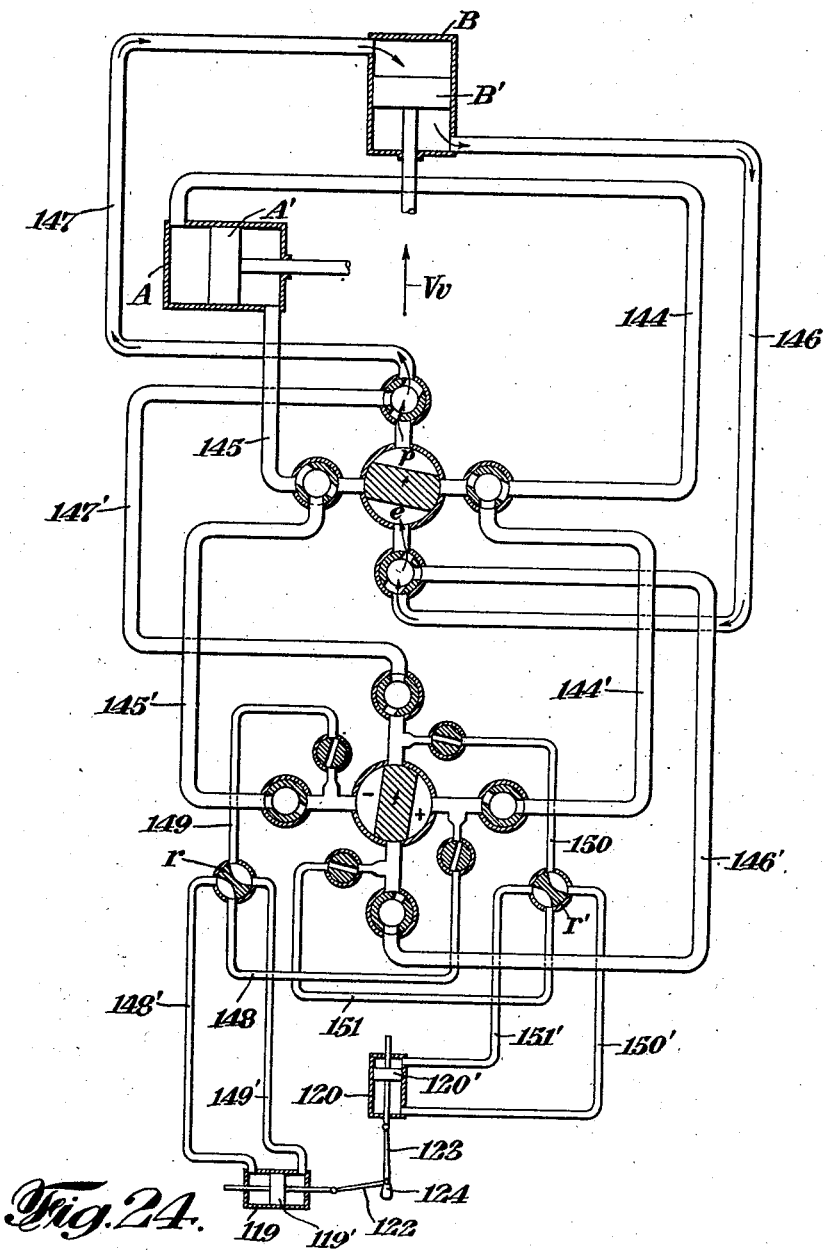
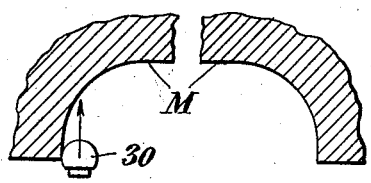
Fig. 24.
INVENTOR
Gilbert V. Anderson
BY
Edwards, Bower & Pool
ATTORNEYS March 27, 1934.   G. V. ANDERSON   1,952,231
MILLING MACHINE
Filed Oct. 20, 1931   20 Sheets-Sheet 16
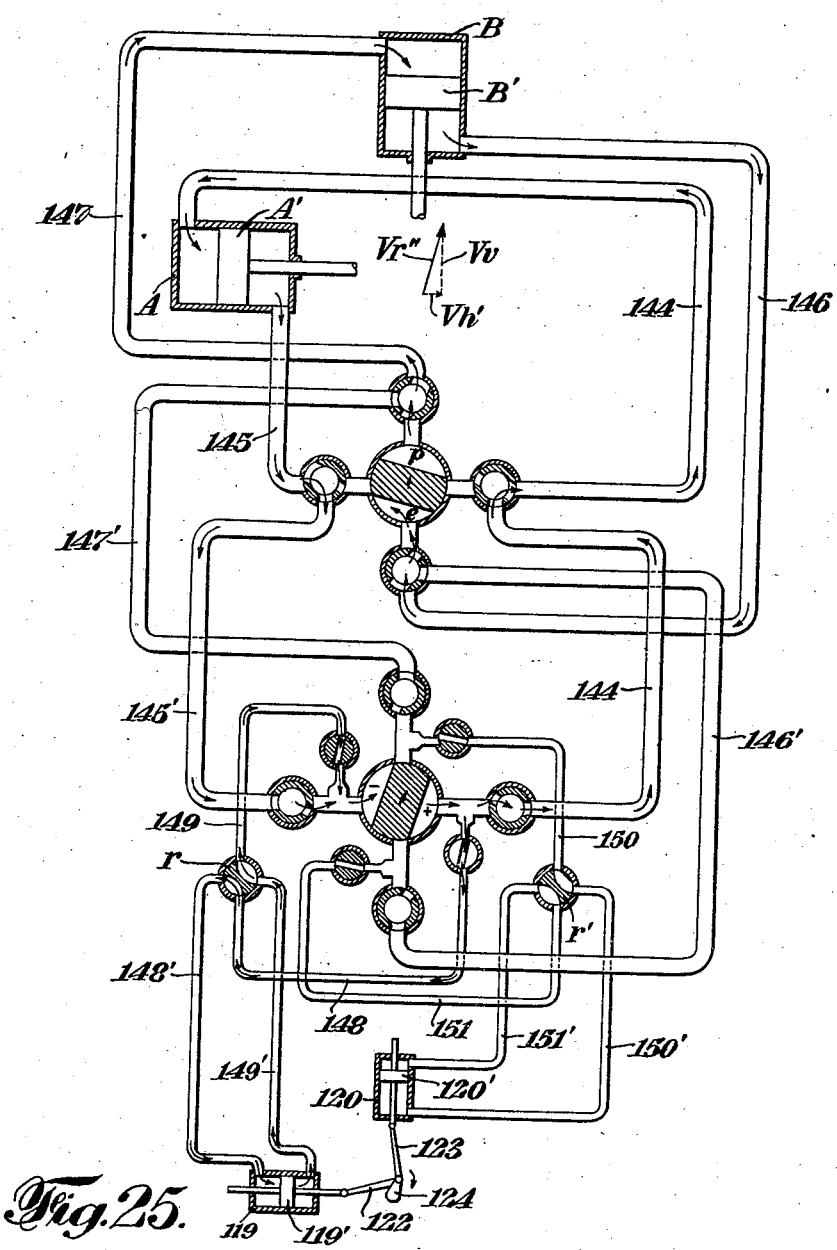
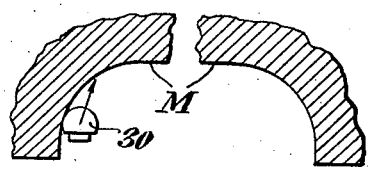
Fig. 25.
INVENTOR
Gilbert V. Anderson
BY
Edwards, Bower & Pool
ATTORNEYS March 27, 1934.  G. V. ANDERSON  1,952,231
MILLING MACHINE
Filed Oct. 20, 1931   20 Sheets-Sheet 17
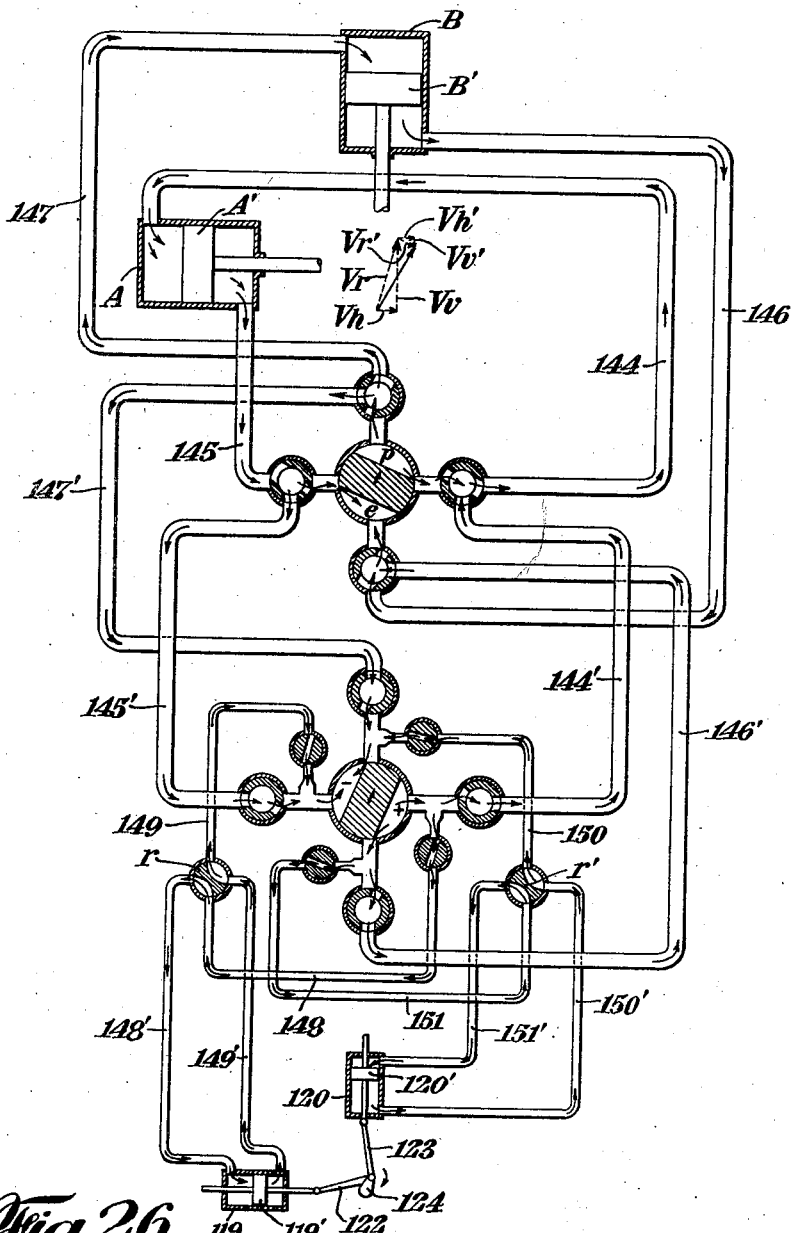
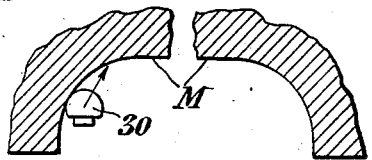
Fig. 26.
INVENTOR
Gilbert V. Anderson
BY
Edwards, Bower & Pool
ATTORNEYS March 27, 1934.  G. V. ANDERSON  1,952,231
MILLING MACHINE
Filed Oct. 20, 1931  20 Sheets-Sheet 18
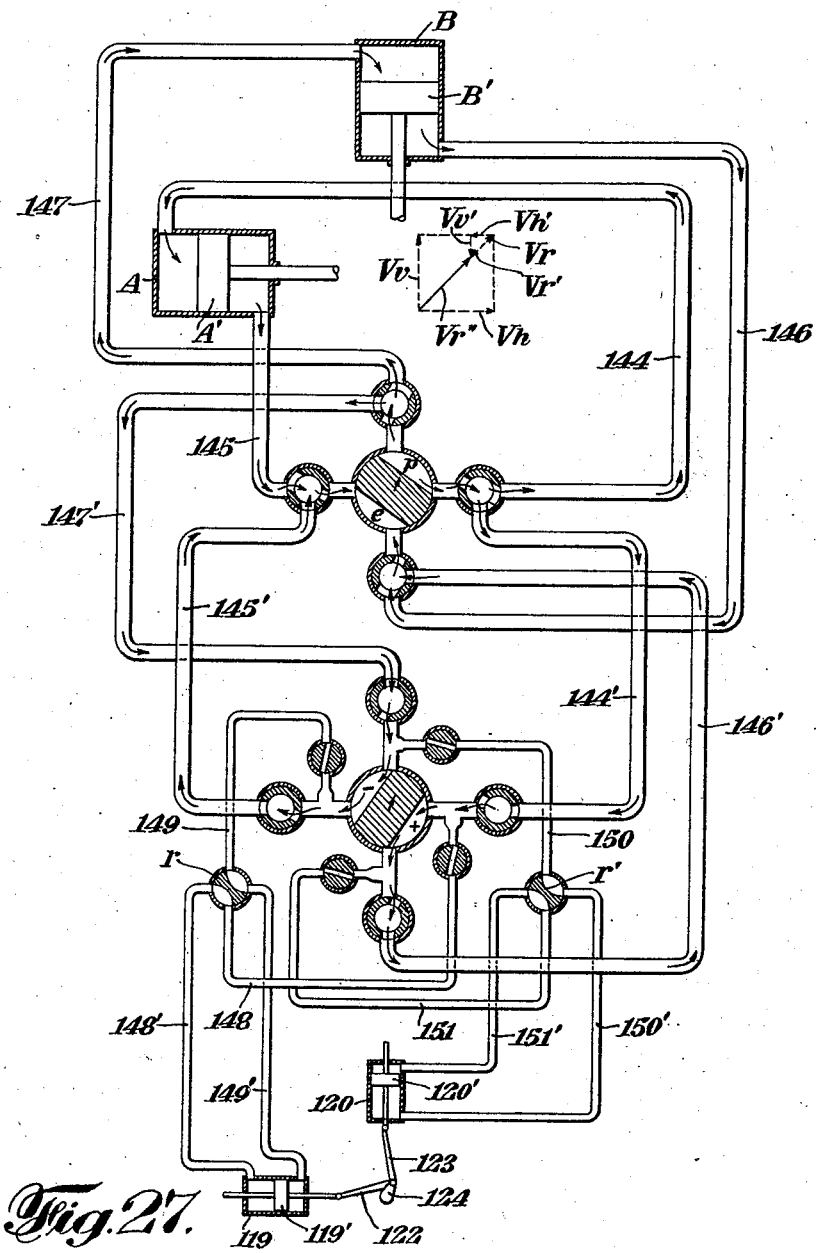
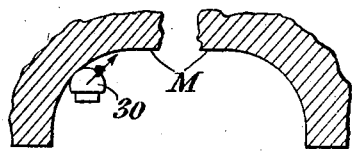
Fig. 27.
INVENTOR
Gilbert V. Anderson
BY
Edwards, Bower, Pool
ATTORNEYS

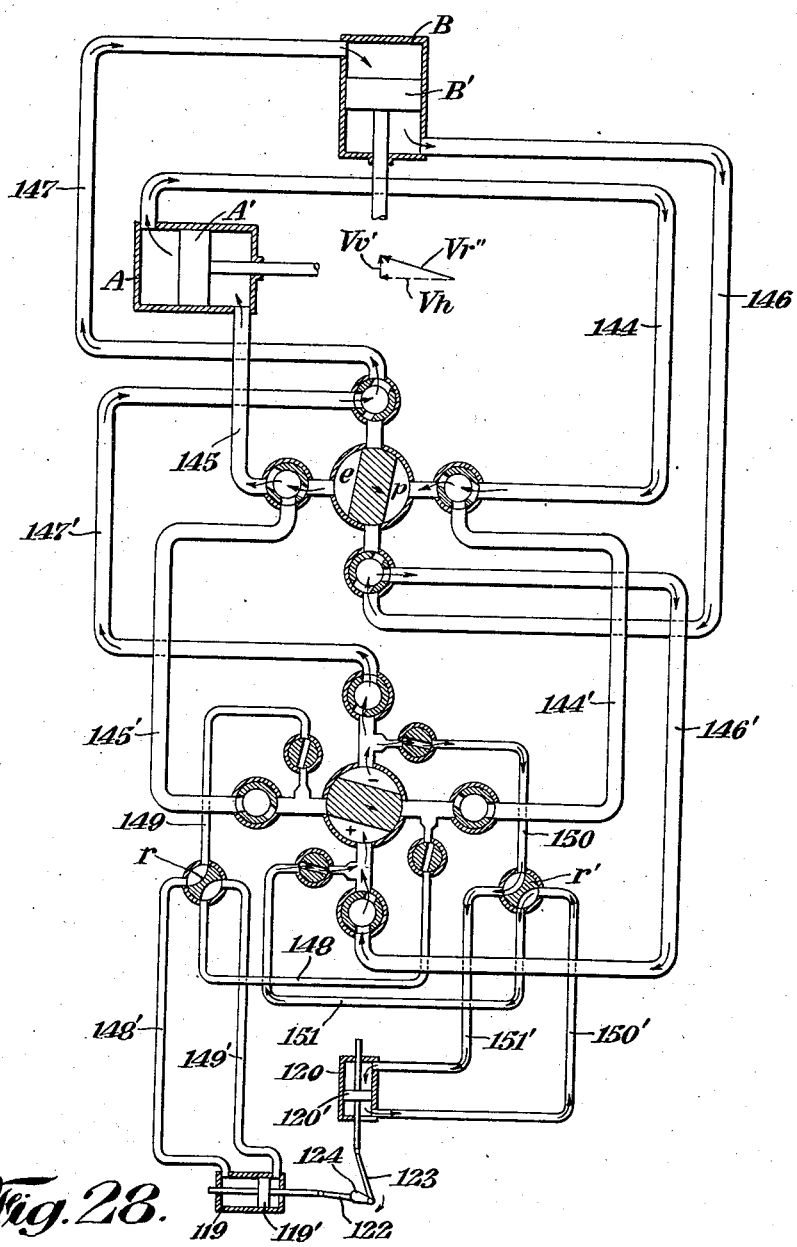
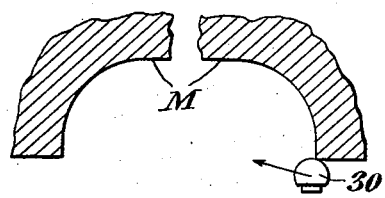

March 27, 1934.  G. V. ANDERSON  1,952,231
MILLING MACHINE
Filed Oct. 20, 1931   20 Sheets-Sheet 20
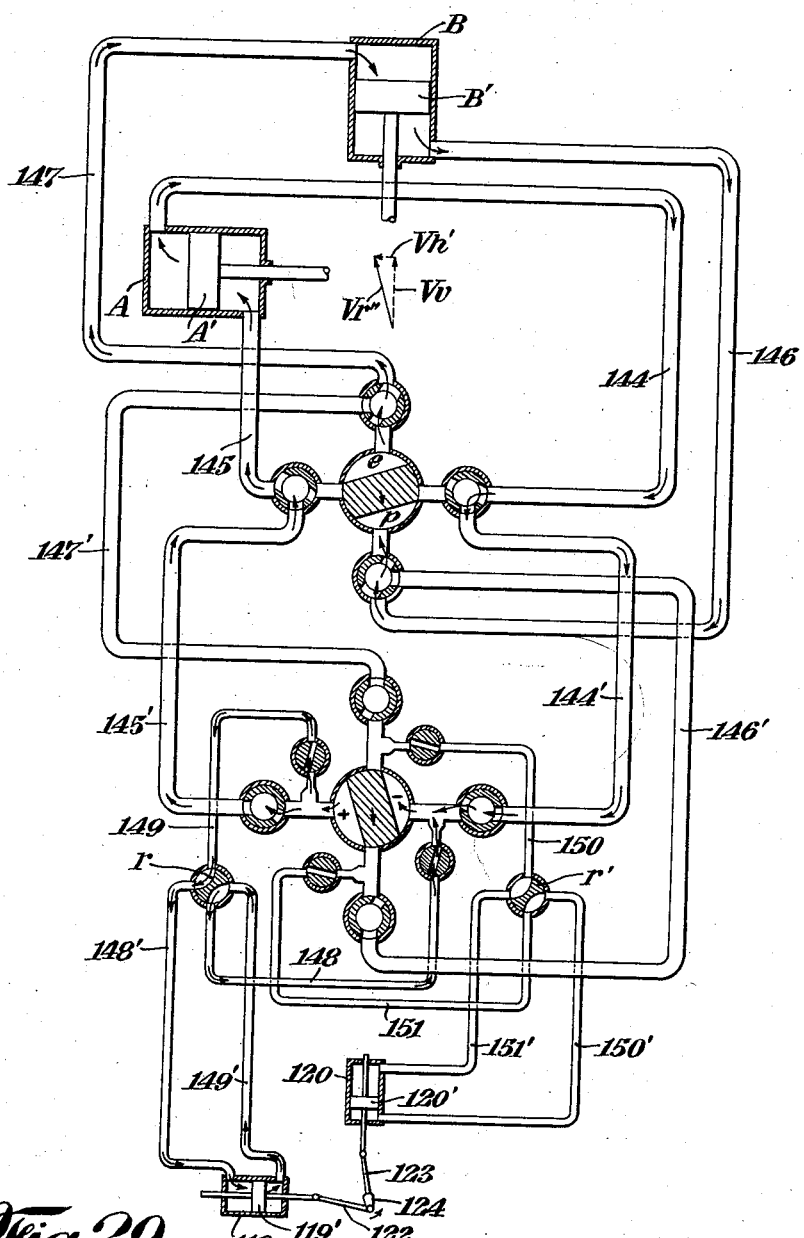
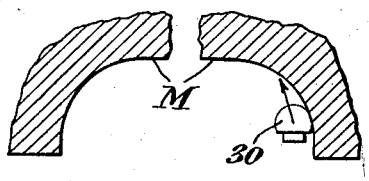
Fig. 29.
INVENTOR
Gilbert V. Anderson
BY
Edwards, Bower & Pool
ATTORNEYS Patented Mar. 27, 1934

1,952,231

UNITED STATES PATENT OFFICE 1,952,231

MILLING MACHINE

Gilbert V. Anderson, Philadelphia, Pa., assignor, by mesne assignments, to The Cincinnati Milling Machine Company, Cincinnati, Ohio, a corporation of Ohio Application October 20, 1931, Serial No. 569,883

38 Claims. (Cl. 90—13.5)

This invention relates to milling machines and particularly to milling machines of the automatic contouring or die-sinking type.

The general object of this invention is to provide a new and improved milling machine, and particularly a contouring or die-sinking machine that will cut irregular shapes in accurate correspondence with a master or pattern of the desired contour which is to be duplicated, the operation being entirely automatic.

A further object of the invention is to provide an automatic contouring or die-sinking milling machine wherein the cutter can be guided through its cutting operation at a constant predetermined rate of feed without regard to the direction of feed of the cutter in following the outline of the master.

A further object of the invention is to provide a comparatively simple automatic contouring or die-sinking milling machine adapted to accurately follow the master at any desired rate of feed of the cutter without the attention of a skilled operator.

A further object of the invention is to provide a contouring or die-sinking machine which will cut irregular shapes in metal with a high degree of accuracy from a master made of wood, plaster of Paris, lead or other soft or fragile material.

A further object of the invention is to provide a machine of the character stated that is hydraulically controlled.

Other objects of the invention particularly in the specific means used to attain these results will hereinafter appear.

To the above ends the invention consists in the combinations of devices, features of construction and arrangements of parts hereinafter described and particularly pointed out in the appended claims.

The machine illustrated in the accompanying drawings embodies the preferred form of the invention, but it is, of course, not restricted in scope to this particular form of machine.

In the drawings

Fig. 1 is a partial plan view of a milling machine embodying the invention;

Figure 2 is a front elevation of the milling machine shown in Fig. 1;

Fig. 3 is a right hand part sectional side elevational view of the machine on line 3—3 of Fig. 2.

Fig. 4 is an elevational view at right hand side of machine showing a hydraulic pump and pressure tank with the necessary piping connections to the machine.

Fig. 5 is a vertical sectional view of the tracer head.

Fig. 6 is a vertical, partly sectional, view of the tracer head on line 6—6 of Fig. 5

Fig. 7 is a vertical sectional view of the primary valve mechanism taken on the section line 7—7 of Fig. 9.

Fig. 8 is a partial plan view of the primary valve mechanism.

Fig. 9 is a horizontal sectional view of the primary valve mechanism on line 9—9 of Fig. 7.

Fig. 10 is a horizontal sectional view of the primary valve mechanism on line 10—10 of Fig. 7.

Fig. 11 is a fragmentary elevation of the primary valve mechanism viewed from the right of Fig. 7.

Fig. 12 is an enlarged diagram of motion of the center of the eccentric of the primary valve mechanism.

Fig. 13 is a vertical elevational section of the secondary valve mechanism taken on line 13—13 of Fig. 14.

Fig. 14 is a plan view of the valve mechanisms and their connections.

Fig. 15 is a vertical sectional view of the distributor valve mechanism taken on line 15—15 of Fig. 14.

Fig. 16 is a vertical sectional view of the distributor valve mechanism taken on line 16—16 of Fig. 14.

Fig. 17 is an enlarged fragmentary diagrammatic horizontal sectional view of the master, and Figs. 18 to 29 inclusive are diagrammatic views illustrating different positions of the valve mechanisms controlling the flow through the hydraulic system; and the corresponding positions of the tracer point which controls the valve mechanisms.

In the embodiment of the invention illustrated in the drawings, reference being had especially to Figs. 1, 2 and 3, a milling machine is shown which is provided with a frame F on the front of which is mounted the travelling carriage C carrying the slide D upon which is mounted the cutter spindle S, which is driven by the electric motor E, and controlled by the tracer mechanism or head T. The carriage C carrying the cutter spindle and tracer head is preferably hydraulically controlled, being moved to the right or left by the action of the piston A' of the hydraulic cylinder A, the piston rod A² being connected to the carriage C as shown. A cutter S' is mounted at the inner end of the spindle S and engages the work W clamped to the work holding frame J. The tracer head T engages the master M which is mounted above the work on the work holding frame J. The work holding frame J is also preferably hydraulically controlled being moved forward and backward by the piston B' of the hydraulic cylinder B. The motions derived from the two cylinders A and B are controlled by valve mechanisms contained in a casing Q attached to the side of the frame F, while the fluid is circulated by a pump system. The motions imparted to the tracer head by the master determine the direction of the resultant motion produced by the cylinders A and B, as will be more fully described hereafter.

As shown in Figs. 4 and 14, the pump system comprises the pump P disposed rearward of the casing Q and which receives the fluid from the bottom of said casing which acts as a liquid sump. The liquid is drawn through the pipe 1 by the pump P and discharged into pressure tank T' through pipe 2. The liquid travels under pressure from the pressure tank T' through pipe 3 to a point where it branches at T connection 4, a portion of the fluid passing through pipe connection 5 into the casing Q where it again branches at T connection 6, a portion of the fluid at this point passing through pipe connection 7 and out again through pipe connection 7' to supply the primary valve mechanism G, mounted below the tracer head T and another portion passing into a pressure relief valve 8 for maintaining approximately constant pressure and permitting the excess fluid to by-pass into the sump at the bottom of the casing Q. Beyond the T connection 4 a second T connection 9 directs a portion of the fluid through a shut-off valve 11 through pipe connection 12 leading inside of casing Q to the reverse valve R, which leads by means of pipes 13 and 14 to the distributor valve mechanism I, and another portion of the fluid through pipe connection 10 and shut-off valve 15 into casing Q through the pipe connection 16 connected to the secondary valve mechanism H which in turn is connected to the primary valve mechanism G by means of the pipe connections 17 and 17'.

The distributor valve mechanism I is for the purpose of directing the flow of fluid pressure to the cylinders A and B so as to direct the cutter in accordance with the contour of the master M. The secondary valve H actuates the distributor valve I, and the primary valve G actuates the secondary valve mechanism H. The primary valve and the secondary valve work together being connected by pipe connections 17 and 17', an explanation of which will be given later. The displacements of the primary valve are magnified by corresponding displacements of the secondary valve.

The cutting of a contour or shape by the present machine is effected by successive profiling cuts across the work. At the end of each profiling cut the direction of feed is reversed by hand and at the same time a relative upward or downward movement between the cutter and work is effected as hereinafter described.

The tracer or tracer mechanism T, Figs. 3, 5 and 6, consists of a body or cylindrical casing 18, secured to the slide D and within which is disposed the tracer bar or rod 19 whose mounting at one end comprises universal joint, element or head 20 having two pairs of pivot pointed screws 20' and 20" arranged at right angles to each other so as to allow universal angular movement of the tracer bar, with the cylindrical casing 18 whereof the screws 20' engage. Said tracer bar is normally held in central position by a circular flanged piece 21 button-like in form having a ball-ended stem 22 engaging a seat or depression 19' in the bar 19 at the opposite end from the universal joint. The ball-ended head of a plunger 23 is held against the central part of button 21 by means of a spring 24 holding the flange of the piece 21 against a stop plate 25 and thus maintaining the ball-ended stem 22 in central position, through its engagement with the inner end of the tracer bar 19, the latter thereby is also held in the central position. The inner end of the plunger 23 is carried in an anti-friction mounting comprising a circular row of balls 26 mounted in a ball cage 27, said balls bearing against a bushing 28. The outer end or head $20^a$ of tracer bar 19 carries a tubular bearing $20^b$ for the slide rod 29 to the end of which the tracer point 30 is attached. The inner end of the rod 29 abuts against a slide pin 31 in the head $20^a$ and which engages a lever 32 pivoted at 33 on the casing 18. A slide rod 34 is attached to the lever 32 and extends through and bears in the detachable head $18^a$, said rod being urged rightward by a coiled spring 34". The plunger 23 and rod 34, respectively, engage adjusting screws 23' and 34' mounted on the upper arm of a bell crank 35 which is pivoted at 36 on the head $18^a$. A spring 37 pulls the upper arm of bell crank 35 to the right so that the points of the screws 23' and 34' contact with the plunger 23 and rod 34 respectively when the tracer point 30 is free and the rod 29 is pushed outward as far as its stop collar 29' will permit, as shown in Fig. 5. Any inward axial movement of the tracer point 30 will, through action of rod 29, pin 31, lever 32 and rod 34, cause a leftward movement of the upper arm of bell crank 35, resulting in an upward movement of the head 38 in which its lower horizontal arm terminates. Conversely, any returning outward axial movement of tracer point 30 will result in a downward movement of bell crank head 38.

Any sidewise movement of the tracer point 30 causing an angular deflection of the tracer bar 19 away from its central position will deflect stem 22 of button 21, causing the flange to tilt and push plunger 23 to the left causing an upward movement of the bell crank head 38. Conversely any returning sidewise movement of tracer point 30 toward its central position will allow a downward movement of bell crank head 38. It will thus be seen that movements of the bell crank head 38 will be produced by either axial movements of the tracer point 30 or sidewise movements of it.

A certain definite vertical position of the head 38 corresponds to the neutral position of the primary valve. This may be attained by means of adjusting the screws 23' and 34', the adjustment being such that with the tracer point 30 free and the parts in the relative positions as shown in Fig. 5, the bell crank head 38 is in its extreme downward position. With this adjustment, the neutral position of bell crank head 38 corresponding to the neutral position of the primary valve would be a certain amount above its downward limiting position, requiring a certain small corresponding inward axial displacement of tracer point 30 or a certain small corresponding sidewise deflection of tracer point 30 away from its central position. These positions of the tracer point 30 are designated as the neutral positions. Further inward axial movements of tracer point 30, or sidewise movements of it away from the center, are designated as positive displacements, while axial movements outward or sidewise movements toward the center from the neutral position are designated as negative displacements. Positive displacements of tracer point 30 cause upward movements of bell crank head 38 above its neutral position, while negative displacements of tracer point 30 cause downward movements of bell crank head 38 below its neutral position.

In the operation of the tracer mechanism the control may be either through movements of the rod 34 caused by axial movements of the tracer point 30, or through movements of the plunger 23 caused by sidewise movements of the tracer point 30. The spring 24 is somewhat stiffer than spring 37 so as to hold the tracer bar 19 in its central position against the sidewise frictional drag of the tracer point 30 in following a contour which is flat or of a moderate degree of incline or decline. In this case the control is through movements of rod 34 caused by axial movements of the tracer point 30. When the degree or slope of the incline or decline becomes quite steep, however, the side thrust in such cases is sufficient to overcome the thrust of spring 24 and cause sidewise deflections of the tracer point 30, causing control through movements of plunger 23. This control through sidewise deflections of the tracer point 30 would occur particularly when coming out of a very steep incline in a depression in the master. In this case the frictional drag on the tracer point would pull rod 29 outward as far as its stop collar 29' would permit which, if the tracer bar 19 were in its central position, would give the maximum negative displacement of the primary valve whereas the neutral position or some position close to it would be required. This would result in a sidewise deflection of the tracer point 30 giving control through its sidewise instead of axial movements.

The operation of the above described tracer mechanism in connection with the hydraulic valve system will be explained after the primary and secondary valve mechanisms have been described.

The primary valve mechanism indicated generally as G and shown in Figs. 7 to 11 inclusive operates, as has been stated, in connection with the secondary valve mechanism H, shown in Fig. 13, the two mechanisms being connected to each other by means of pipe connections 17 and 17'. Variations in pressure produced by displacements of the primary valve spindle 39 are transmitted by the pipe connections 17' and 17 to a small piston 40 which is integral with the secondary valve spindle 41, and force it against spring 42, causing movements of the secondary valve spindle 41 to the right or left as may be required in the operation of the machine. There is a considerable magnification of motion by this arrangement as quite appreciable movements of the secondary valve spindle 41 are caused from comparatively minute movements of the primary valve spindle 39.

The primary valve mechanism consists essentially of the valve spindle 39 with an enlarged head 43, the two sides of which are partly cut away forming steps 44 which engage the bifurcated lower arm or forked fingers 45 at the lower end of lever 46 which is pivoted at 47. The upper arm 48 of lever 46 engages a tapered shoe or interposer 49 attached to the lower end of a rod 50, the upper end of which has a flexible mounting in the head 38 of bell crank 35 of the tracer mechanism. This flexible mounting comprises two light springs 51 and 51', held in place by screw caps 52 threaded into the head 38 at its top and bottom and which engage washers 53 and 54, and normally hold the upper and lower faces of the head 55 attached to stem 50 exactly coincident with the upper and lower faces of a disc 56. The disc 56 has a clearance hole in the center for loosely embracing the head 55, and is held from displacement by the screw caps 52. It is tapered or relieved to the right and left as shown so as to provide for any angularity of the lower arm of bell crank 35 as it swings on its pivot 36, but the thickness of the central or unrelieved portion directly in front and back of the head 55 is exactly the same as that of the head. The tapered abutment 49 and arm 48 fit in a slot 57 in a movable element or reciprocatory bar 58. The left hand end of the slot 57 is rounded as indicated at 58' in correspondence with the nose or end of the arm 48 where it engages the abutment 49. The bar 58 is adapted to slide in two guides 59 and 60 on the valve member G and is reciprocated a small amount by means of an eccentric portion 61 of shaft 62, the eccentric strap 63 of which is connected to the bar 58 by a pivot pin 64. The eccentric shaft 62 is rotated by suitable motor means such as the small electric motor K, Figs. 2 and 3, mounted above the tracer head on the casing 18. The pulleys 65 and 66, and the belt 67 provide an operative connection between the shaft 62 and the shaft of the motor K. The inner end of eccentric shaft 62 carries a pinion 68 which meshes with a second pinion 69 which in turn meshes with a third pinion 70, the pinions 69 and 70 being mounted on rotary valves 71 and 72 respectively. As all three pinions are of the same size and have the same number of teeth, the two rotary valves 71 and 72 rotate at the same speed as eccentric shaft 62 and in the directions indicated by the arrows in Fig. 7. The rotary valves 71 and 72 control the flow of fluid from and to a chamber 73 formed at the right hand end of the primary valve spindle 39. A groove 74 affords communication between the two rotary valves and the chamber 73. Pipe connection 7' conveys fluid under pressure from the pump to a passage 75 leading to the primary valve and to passages 76, 77 and 78, which lead to the annular groove 79 of rotary valve 72. In certain angular positions of rotary valve 72, the U-shaped valve portion 80 uncovers hole 81 allowing flow of fluid past the spring seated check valve 82 to passage 74 leading to chamber 73. The upper end of groove 74 leads to a hole 83 which, with rotary valve 71 in the position shown in the drawings, coincides with a hole 84 which leads to a hole 85 in the center of the rotary valve 71. The hole 85 directs the fluid to four small holes 86 leading outwards to the annular groove 87 which communicates with passage 88 leading to groove 89, passage 90 and passage 91 which connects with the primary valve and leads to the sump in the bottom of the casing Q through pipe connections 92' and 92.

Fig. 12 shows diagrammatically and on an enlarged scale the motion of the center of the eccentric 61 and the timing of the rotary valves 71 and 72. When the eccentric has rotated to the position L, communication has just been established between hole 83 and hole 84 of rotary valve 71, and valve portion 80 of rotary valve 72 has just started to cover hole 81. During the rotation of the eccentric from position L to position N past its inner dead center U, rotary valve 71 is open and rotary valve 72 is closed. At position N communication between hole 83 and hole 84 of rotary valve 71 is broken and valve portion 80 uncovers hole 81 so that as eccentric rotates from position N to its outer dead center V and back to position L, rotary valve 71 is closed and rotary valve 72 is open.

The primary valve stem or spindle 39 comprises, besides its head 43, three enlarged portions, flanges or steps 93, 94 and 95, between which are formed two annular spaces 96 and 97. Fluid under pressure is led into annular groove 97 from the pressure tank T' by means of the pipe connections 7 and 7' leading to passage 75, as has been stated. From the annular space 97 a portion of the liquid escapes through opening 98 leading into the annular groove or port 99 surrounding the central enlarged portion 94 of the primary valve spindle. The width of the enlarged portion 94 is slightly less than the width of the annular port 99, permitting escape of the fluid into port 99 through opening 98 and out again through opening 100 into the annular space 96, from whence it escapes to the sump in the casing Q through passage 91 and pipe connections 92' and 92.

Any movement of the primary valve stem 39 to the left will increase the size of the opening 98 through which the fluid from pressure tank T' enters the annular space 99 and at the same time this same movement decreases the size of the opening 100 through which the fluid escapes from the annular passage 99, the result being an increase in the fluid pressure in the annular space 99. As the annular space 99 is connected by means of passages 101, 102 and 103 to the chamber 104, which in turn is connected by means of passage 105 to pipe connections 17' and 17 leading to the passage 106 of the secondary valve mechanism, the increase in pressure in annular space 99 is transmitted to the piston 40 of the secondary valve spindle 41 forcing it to the right against the action of spring 42. Conversely, any movement of the primary valve stem 39 to the right will reduce the size of the opening 98 through which the fluid enters the annular space 99 and at the same time increases the size of the opening 100 through which the fluid escapes to the sump, the result being a reduction in the pressure in the annular space 99 which reduces the pressure on the piston 40 of the secondary valve permitting the spring 42 to force the secondary valve to the left.

Any movement of the secondary valve spindle to the right, caused by an increase in pressure acting on piston 40, will cause the enlarged portion or step 107 of the secondary valve to uncover port 108, opening communication between the port and the space between the two enlarged portions or steps 107 and 109, permitting the pressure from the pressure tank to flow through pipe connections 16 and passage 110 which communicates with this space, into port 108 and pipe connection 111 which is connected to the distributor valve I. The same movement of the secondary valve moves step 109 away from the port 112 opening communication to pipe connection 113 leading from the distributor valve, permitting escape of liquid from the pipe connection 113 to port 112, past the step 109 to passage 114 leading to the sump. Any movement to the left of the secondary valve, caused by a decrease in pressure on piston, will cause the fluid to flow into pipe connection 113 to the distributor valve I and permit the fluid to escape from the distributor valve through pipe connection 111 to the right of step 107 and through passage 115 leading to the sump.

The operation of the primary and secondary valve mechanisms in connection with the tracer valve mechanism will now be explained. With the eccentric 61 in the position U as shown in Fig. 12 the primary valve spindle 39 will be forced to the right by means of the piston 116, which engages the projection 116' on the left end of the spindle as the liquid pressure in annular space 99 acts on the left end of piston 116, and, the upper rotary valve 71 being open to the sump, no hydraulic resistance will be met with on the right end of primary valve spindle in chamber 73. This action of piston 116 will hold the steps 44 of primary valve spindle 39 against the bifurcated arm 45 of the lever 46 and cause the upper lever arm 48 to contact with the tapered shoe 49 and hold it against the left hand side 58' of the slot 57 in the reciprocating bar 58. As the eccentric rotates beyond position U, there will be a very slight movement to the right of the primary valve spindle 39 until position N is reached, at which point the upper rotary valve 71 closes and no further movement of the primary valve spindle can take place because of the incompressibility of the liquid in chamber 73 and the passages 74, 83 and 81' to which it is connected; and even though the lower rotary valve 72 opens at position N, no flow of liquid can take place as the pressure built up in chamber 73, by the force of piston 116, is greater than the working pressure in the tank T'. Consequently check valve 82 will be held tightly to its seat. The primary valve spindle will thus be held in the position it has acquired at position N of rotation of the eccentric as the eccentric continues its rotation beyond this point.

From this it will be seen that the arrangement of rotary valves 71 and 72 acting in connection with the piston formed by the right hand end of primary valve spindle at chamber 73 serves as a hydraulic lock to the primary valve spindle 39, holding it in a given position while rotation of the eccentric takes place to its outer dead center at position V and back again through the angle NOL, during which time freedom of vertical movement of the interposer or shoe 49 is allowed because of the corresponding movement to the left of the movable member reciprocating bar 58, the arm 48 of lever 46 being held to the right by means of a coiled spring 117 acting through a plunger 118 in which it is housed. If the interposer or tapered shoe is in its neutral position vertically corresponding to the neutral position of the tracer point 30, then the primary valve spindle 39 will be in its neutral position, with the step 94 central with annular space 99, as shown in Fig. 7; and the secondary valve spindle 41 will be in its neutral or central position as shown in Fig. 13. If no vertical movement is imparted to the tapered shoe 49 during rotation of the eccentric from N to L, then the shoe will be gripped between the surface 58' of reciprocating member bar 58 and the arm 48 of lever 46 at position L directly above position N and the only motion imparted to the primary valve spindle 39 during the complete cycle represented by rotation of eccentric from N to N will be the small amount of movement represented by X during the time the eccentric is passing its inner dead center U in rotating from L to N which is of no material consequence.

If, however, the tapered shoe 49 should receive an upward movement, in response to a positive displacement of the tracer point 30, during the time of rotation of eccentric through angle NOL when it is free, then it will be gripped between surface 58' of reciprocating bar 58 and the arm 48 of lever 46 at some position such as L' in the rotation of the eccentric in advance of position L, and a leftward movement will be imparted to the primary valve spindle 39 of an extent represented by Y, during rotation of eccentric from L' to L This movement of the primary valve spindle 39 will cause a proportionate amount of liquid to be drawn into chamber 73 from pressure tank T' past check valve 82, as rotary valve 72 is open during this angle while rotary valve 71 is closed. If no further vertical movement of tapered shoe 49 should occur during the succeeding cycle the new position of the primary valve to the left of its central position will be maintained due to the extra quantity of liquid which was drawn into chamber 73, and gripping and releasing of the tapered shoe 49 will occur at positions L and N as before. It will be seen that the shoe, interposer or connector 49 controlled by the tracer point is a mechanical device variably interposed or settable between the movable member 58 and the lever 48 to variably control the primary valve of the hydraulic system.

This displacement of the primary valve spindle 39 to the left caused by a positive displacement of the tracer point 30 will cause a corresponding movement of secondary valve spindle 41 to the right causing a flow of liquid to take place to the distributor valve through pipe 111 and allowing a flow of liquid to take place from the distributor valve to the sump through pipe 113.

If the tapered shoe 49 should receive a downward movement, in response to a negative displacement of tracer point 30, during the rotation of eccentric through angle NOL, it will still be free at position L, at which position the rotary valve 72 closes and the rotary valve 71 opens. Opening of the rotary valve 71 will release liquid from chamber 73 allowing flow to the sump as piston 116 forces primary valve spindle 39 to the right until finger 48 of lever 46 grips tapered shoe 49 against surface 58' of reciprocating bar 58. When the eccentric has rotated to position N, rotary valves 71 and 72 close and open respectively and the position of the primary valve spindle 39 to the right of its neutral position thus acquired will be held while the eccentric completes its cycle. If no further movement is imparted to the tapered shoe 49, gripping and releasing will occur at positions L and N as before. This displacement of the primary valve spindle to the right caused by a negative displacement of the tracer point will cause a corresponding movement of secondary valve spindle 41 to the left causing a flow of liquid to take place to the distributor valve in a reverse direction through pipe 113 and allow a flow to take place from same to the sump through pipe 111.

The piston 116, in addition to serving as a means of moving primary valve spindle 39 to the right has the function of eliminating the time lag incident to the operation of the primary valve. If piston 116 were removed and substituted by a spring the time required to actuate the secondary valve would delay its action and cause a certain amount of "hunting" in the action of the machine; whereas with the arrangement as shown in Fig. 7, any movement of the primary valve spindle 39 is accompanied by an instantaneous movement of the secondary valve due to the movement of liquid in passage 105 and pipe connections 17' and 17 leading to secondary valve piston 40 caused by the displacement of piston 116. As its area is considerably greater than that of piston 40 of secondary valve spindle, there is a considerable multiplication of movement of same corresponding to a given movement of the primary valve spindle 39. This stabilizing action of piston 116 although not absolutely necessary, gives a somewhat smoother action to the machine than would be obtained without its use. The pipe connections 7', 17' and 92' between the primary valve mechanism G and the casing Q are preferably of metallic hose, leak proof and flexible to allow movements of the primary valve mechanism G with respect to the casing Q in the operation of the machine.

When the machine is in operation any movements of the primary and secondary valve spindles caused by the action of the primary valve mechanism in response to displacemnts of the tracer point 30, will take place in small successive increments owing to the high rotational speed of the eccentric 61 and rotary valves 71 and 72. The operation of the machine would, however, be substantially the same as though the displacements of the primary and secondary valves were at all times exactly proportional to displacements of the tracer point, and the effort required at the tracer point to actuate the primary and secondary valves is only that required to overcome the comparatively light forces of springs 34", 37 and 51, or 24, 37 and 51 as the case may be, so that soft or fragile materials may be used for the master.

The distributor valve mechanism best shown in Figs. 14, 15 and 16 will next be described in detail. Said mechanism, generally designated as I, comprises a rotary valve structure operated by two hydraulic cylinders 119 and 120 provided with pistons 119' and 120'. The pistons are connected to a common crank pin 121 by means of connecting rods 122 and 123, the crank pin 121 being connected to crank 124 located at the lower end of the distributor valve stem 125. The distributor valve mechanism comprises two sections, a main or upper valve shown on line A—A of Figs. 15 and 16, and a lower or auxiliary valve shown on line B—B of Figs. 15 and 16. The main valve is connected to the pressure tank T' by the pipe connections 13 or 14, depending upon the position of reversing valve R, and controls what will be termed the "main flow" of the distributor valve mechanism. Pipe connections 13 and 14 lead to the annular grooves or spaces 126 and 127 respectively of stem 125 of the distributor valve mechanism. Annular groove 126 connected with pipe 13 leads upwardly to the pressure opening $p$ of the main valve. The main valve is also provided with an exhaust opening $e$ which leads upwardly to the annular groove 127 of stem 125 which connects with pipe 14. The auxiliary valve is connected to the secondary valve H by means of pipe connections 111 and 113 and controls what will be termed the "auxiliary flow" of the distributor valve mechanism. Pipe connection 111 leads to the annular groove 128 on the valve stem 125 upwardly to the positive opening $+$ of the auxiliary valve. The pipe connection 113 from the secondary valve H communicates with the annular groove 129 which leads downwardly to the negative opening—of the auxiliary valve.

The purpose of the main valve of the distributor system is at all times to so direct the flow of fluid pressure to the main operating cylinders A and B as to give approximately the required direction to the resultant motion of the tracer and cutter. The purpose of the auxiliary valve with the openings placed at right angles to the main valve is to modify the flow of fluid caused by the main valve so as to cause it to give exactly the required direction to the resultant motion of the tracer and cutter. The auxiliary valve is also a means for regulating the flow of fluid pressure to the cylinders 119 and 120 acting on the crank 124 at the lower end of the valve stem of the distributor valve mechanism to cause the necessary rotation of the stem 125 at every change in the contour of the master at which a change in the direction of the resultant force is required.

The rate of feed of the work to the cutter S' is controlled by four speed control valves 130 which control the openings leading from the main and auxiliary valves. These speed control valves 130 are provided with crank arms 131 and with crank pins 132 extending into openings in a rotatable plate 133. Attached to the plate 133 is an arm 134 carrying a screw block 135 operated by screw 136 extending through the casing Q and provided with a hand knob 137. The rotation of the knob 137 to the right or left rotates plate 133 which acts upon the crank pins extending above the speed control valves 130, rotating the four valves in unison so as to provide a means for regulating the rate of feed of the work against the cutter.

The flow from the auxiliary valve is branched, a portion going through the apertures 138 leading to restricted openings 139 of the speed control valves 130 which lead through the small reversing valves r and r' and into the cylinders 119 and 120 respectively. The lower ends of the speed valve spindles are somewhat reduced and the passages 139 through them are made relatively small so that the openings for any given setting of the speed valve will be considerably smaller relative to the opening to the upper sections of the speed valves at the main and auxiliary valves so that the velocity of rotation of the valve stem 125 caused by the action of cylinders 119 and 120 will not be excessive. It will be understood that all of the openings controlled by the control valves 130 close and open in unison.

The distributor valve stem 125 extends beyond the casing Q and is provided with a knob 140 for controlling the valve by hand when the machine is used as a plain hydraulic power fed milling machine, giving the relative motion of the cutting chine, the relative motion of the cutting in any one of the four directions, the knob 140 being provided with an indicator to indicate relative motion that will be imparted to the cutter and tracer by the distributor valve mechanism. When the machine is used as a plain milling machine the valve 15 is shut off as the primary valve G and the secondary valve H are then not necessary.

The distributor valve I is used to direct the motion in setting up the work preparatory to using the machine for automatic contouring in connection with the speed valves which are operated by the knob 137. The master M is brought to proper contact with the tracer point 30 by means of the distributor valve and speed control valves which are manually operated by the knobs 140 and 137 respectively. When proper contact is made the speed valves are closed and the valve 15 is opened so that the secondary valve H may function and cause automatic operation during contouring when the speed valves 130 are opened again by knob 137.

The reversing valve R, Fig. 14, reverses the main flow and is used for reversing the feed at the end of a cut as at points R' and R'' on the work W as shown in Fig. 1 in order to start a new cut in the opposite direction. Reversing valve R is connected by means of the links 141 to two smaller reversing valves r and r' which reverse the direction of flow to the small cylinders 119 and 120 for rotating the distributor valve. Operation of these reversing valves is effected by means of the lever 142 at the top of casing Q which is connected to the spindle of reversing valve R extending above the casing. When the reversing lever 142 is to the right as shown in Fig. 1, the relative motion of tracer 30 and cutter S' with respect to the master M and work W is in the direction of the arrow on knob 140 at the top of the distributor valve spindle and lever 142 is kept to the right as shown in Fig. 1 when setting up the work. When lever 142 is thrown to the left in reversing at the end of a cut, the relative motion imparted to tracer and cutter with respect to the master and work is opposite to that shown by the arrow, but otherwise the action of the machine is the same as with the reversing valves in the positions as shown in Fig. 14. The operation of machining a contour is accomplished by means of successive profiling operations and at every reversal at the end of a profiling cut the cutter and tracer are advanced upwardly or downwardly across the work and master, as the case may be, by means of the lead screw 143 shown in Fig. 2, the upper end of which has a squared extension suitable for a crank or wrench to be used for turning it.

Figs. 18 to 29 inclusive are diagrammatic views showing the relation of the main and auxiliary valves during the operation of the milling machine, the openings of the main valve being designated p and e which are the pressure and exhaust openings, and the auxiliary valve openings designed + and − showing the positive and negative openings. A positive displacement of the tracer point causes fluid pressure to flow from the pressure tank through pipe 111 and into the positive opening of the auxiliary valve, at the same time permitting fluid pressure to escape to the sump from the negative opening of the auxiliary valve connected with pipe connection 113. Conversely, a negative displacement of the tracer point causes fluid to flow from the pressure tank to the negative opening of the auxiliary valve, permitting escape of fluid pressure to the sump from the positive opening.

Figs. 18 to 29 inclusive show diagrammatically the relation of the various parts in describing the various positions of the tracer point shown diagrammatically in the lower left hand corner of each figure. It is understood that in these various diagrammatic views the cutter and tracer only are represented as moving in the direction indicated, the work and master represented as being stationary. In practice, however, it is well known that in machines of various types in connection with which it may be desired to utilize the improved control the feed controls may in some cases move the tracer and cutter while the work and master or pattern remain stationary. In other cases the work and master may be moved while the tracer and cutter remain stationary and, further, both the work and master and cutter and tracer may be moved for the desired feeds as is the case in the machine represented by the accompanying drawings.

At or near the intersection of the axes of the main or operating cylinders A and B on each of these diagrammatic views, a velocity diagram is shown which represents the various relative components and resultant velocities of the tracer and cutter with respect to the master and work. The horizontal and vertical components of the velocity of motion produced by the main flow are designated by the reference characters $Vh$, $Vv$ respectively, while the resultant velocity of these motions produced by the main flow will be represented by the reference character $Vr$. The horizontal and vertical components of the velocity produced by the auxiliary flow will be designated by the reference characters $Vh'$ and $Vv'$, respectively, while the resultant of these velocities will be represented by the reference character $Vr'$. The resultant of the main and auxiliary resultant velocities $Vr$ and $Vr'$ respectively will be represented by the reference character $Vr''$. This reference character $Vr''$ represents the actual relative velocity of the tracer and cutter with respect to the work and master when an auxiliary flow takes place, as shown in Figs. 19, 20, 21, 22, 23, 25, 26 and 27, while the actual relative velocity will be represented by $Vv$ or $Vh$ when no auxiliary flow takes place, as in Figs. 18 and 24. In these figures upward motions of the piston B' represent backward motions of the work holding frame when viewing the machine as shown in Fig. 1, which would therefore produce a relative forward movement of the tracer and cutter and consequently in this case downward velocities are shown on the velocity diagrams. Conversely, the downward motions of piston B' of these views represent forward motions of the work holding frame which would therefore produce relative backward movements of the tracer and cutter and consequently in this case upward velocities are shown on the velocity diagrams.

In Fig. 18 the motion of the tracer and cutter is to the right as represented by the arrow at the tracer point 30 in the lower left hand corner which shows the direction of the resultant relative motion of the tracer with respect to the master in all of the diagrammatic views of Figs. 18 to 29 inclusive. At the position of the tracer point 30 shown in Fig. 18 the main valve directs the flow from the pressure opening $p$ through the pipe connection 144 leading to the left side of the piston A' of the cylinder A, forcing it to the right, the return being through pipe connection 145 into the exhaust opening $e$. As the required motion in this case is parallel to the motion of the piston A', no motion is required of piston B' and the passages leading from the main valve to the cylinder B are closed. The passages leading from the auxiliary valve to the cylinder B are open as its openings are at right angles to those of the main valve but no flow will take place as the tracer point 30 is in its neutral position and consequently the secondary valve stem 41 is also in its neutral position and no flow of liquid takes place.

If there should be any displacement of the tracer arm because the line of the master should not be exactly parallel or a leakage be present, the resulting flow into the auxiliary valve would cause a motion of the piston B' at right angles to that produced by the piston A' such as would tend to restore the tracer arm to its neutral position and prevent further displacement. For example, if a slight positive displacement should occur due to any of the causes stated, such displacement would cause a flow of fluid into the positive opening of the auxiliary valve. This would direct the flow through passage 146', pipe connection 146 and into the bottom of cylinder B, causing an upward motion of the piston B', with a return flow through pipe connection 147 and passage 147' into the negative opening of the auxiliary valve which would lead to the sump. This upward movement of the piston B' would move the master away from the tracer point and would tend to reduce or prevent further positive displacement of the tracer point.

If, on the other hand, a negative displacement should occur due to any of the causes above mentioned, such displacement would cause a downward movement of the piston B' which would move the master toward the tracer point and tend to reduce or prevent further negative displacement of the tracer arm. With the parts in the relation shown in Fig. 18, fluid pressure from the pressure opening of the main valve is transmitted through passage 144' to pipe connection 148, which is directed by the small reversing valve $r$ through pipe connection 148' to the left end of cylinder 119, while the right end of cylinder 119 connects by means of pipe connection 149' leading back to reversing valve $r$ and from thence to pipe connection 149 connecting through passage 145' with the exhaust opening of the main valve but this cannot cause rotation of the distributor valve stem because the pressure exerted on the crank pin 121 by the piston 119' is radial to the crank 124 at the lower end of the distributor valve stem and there is consequently no tangential component to cause rotation.

It will be thus readily seen that at no angular position of the distributor valve can pressure from the main valve which is transmitted to the pistons of the small cylinders 119 and 120 by means of pipes attached thereto, cause rotation of the distributor valve spindle as the resulting pressure in every case will be approximately radial to the crank. This follows from the fact that the center of the pressure opening $p$ of the main valve is situated at the same angular position about the center of the distributor valve as the crank pin 121 is situated, so that the resultant pressure exerted upon the crank pin will always be approximately radial. In this connection it should be noted in the diagrammatic views, Figs. 18 to 29 inclusive, that the pipe connections and passages leading from the upper, right hand, lower and left hand openings, respectively, of both the main and auxiliary valves are arranged so that liquid leaving either valve in a given direction will produce motion of either of the operating pistons A' or B' so as to give a resultant motion to tracer and cutter in the same direction; also that pressure will be exerted on either of the small pistons 119' or 120' in the same direction. It should be noted further that as the positive and negative openings of the auxiliary valve face in directions at right angles to that of the pressure openings of the main valve, any flow from the auxiliary valve through the pipe connections connecting with one or both of the small cylinders 119 and 120 will cause rotation of the distributor valve stem as the resulting pressure exerted on the crank pin will be approximately tangent to the crank 124 and therefore cause rotation of the same.

The motion shown in Fig. 18 continues until the tracer point 30 passes the corner Z of the master and for a short distance in the same straight line but the springs 34'' and 37 of the tracer head which cause the tracer point 30 to bear against the master causes the tracer point to move outward slightly which gives it a slight negative displacement with respect to its neutral position. This negative displacement causes, through the action of the primary and secondary valves, flow of fluid into the negative opening of the auxiliary valve which faces in a direction at right angles to the pressure opening of the main valve as shown in Fig. 19. This causes flow into passage 147' leading to pipe connection 147 which connects with the upper side of the cylinder B causing a downward motion of the piston B', the fluid returning through pipe connection 146 leading to passage 146' and thence to the positive opening of the auxiliary valve from which it returns to the secondary valve and to the sump. The downward motion of the piston B' causes a relatively upward motion of the tracer and cutter having a component $Vv'$ at right angles to the motion $Vh$ which is shown on Fig. 18 produced by the main flow giving the resultant relative motion $Vr''$ leading upwardly as shown in Fig. 19. This change of the direction of the resultant motion of the tracer and cutter limits the amount of the negative displacement of the tracer point. The flow of fluid into the negative opening of the auxiliary valve also causes flow into the pipe connection 150 leading through the small reversing valve $r'$ to pipe connection 150' which leads to the bottom of cylinder 120 causing upward motion of the piston 120'. The flow returns through pipe connection 151' which leads through the reversing valve $r'$ to pipe connection 151 connecting to the positive opening of the auxiliary valve and from there to the sump. This upward motion of the piston 120' causes a slow counter clockwise rotation of the distributor valve stem.

In Fig. 17 portions of the master M are shown and below it a solid and a dotted line. The solid line shows the actual path of the center of the tracer point in describing the outline of the master. The dotted line shows the path that would be described by the center of the tracer point if it remained at its neutral position throughout. The deviation of the dotted line from the solid line at any position shows the displacements of the tracer point. Negative displacements take place where the dotted line is farther from the master than the solid line and positive displacements take place where the dotted line is nearer to the master than the solid line. The numerals 18' to 29' inclusive along the solid line show the position of the tracer point corresponding to the successive events illustrated in Figs. 18 to 29 inclusive. The distance between the solid and dotted lines shown in Fig. 17 show to a large scale the amount of displacements of the tracer point at any position.

As motion continues beyond the point Z' it is evident that the upward component $Vv'$ shown in Fig. 19 will be increased, caused by an increasing negative displacement as represented in Fig. 17. Motion continues with an increase in the negative displacement and a corresponding increase in the upward component $Vv'$ until the counter clockwise rotation of the distributor valve spindle caused by the branched flow from the auxiliary valve to the small cylinder 120 has progressed to a point where the main valve uncovers the lower and upper passages connecting with the pipe connections 147 and 146 leading to and from the vertical operating cylinder B and the auxiliary valve uncovers the horizontal passages connected to the passages 145' and 144' leading to and from pipe connections 145 and 144 respectively which connect with the horizontal operating cylinder A and pipe connections 149 and 148 leading to and from small horizontal cylinder 119 as clearly shown in Fig. 20. The uncovering of the vertical passages of the main valve causes a main flow through the pipes leading to and from the vertical operating cylinder B, giving an upward component of motion $Vv$ as shown on the velocity diagram of Fig. 20.

The uncovering of the left-hand horizontal passage of the auxiliary valve leading to passage 145' permits fluid to flow through it to the restricted opening of the speed valve 130 between pipe connection 145 and the main distributor valve. This would increase the back pressure in pipe connection 145 if piston A' continued to move at the same velocity as before. Uncovering of the right-hand horizontal passage of the auxiliary valve leading to the passage 144' permits some of the fluid from the main flow into pipe connection 144 to escape through passage 144' into the positive opening of the auxiliary valve and to the sump. This would decrease the pressure in pipe connection 144 if piston A' continued to move at the same velocity. The net result of these auxiliary flows reduces the velocity of piston A' caused by the main flow which produces the horizontal component of motion $Vh$ to the right. This reduction in $Vh$ is represented on the velocity diagram by the separate component $Vh'$ to the left instead of by reduction in the length of $Vh$, and by this means it is possible to represent the effect of the auxiliary flow upon the resultant motion separate and distinct from that of the main flow. The net effect of the main flow is represented by the resultant $Vr$; that of the auxiliary flow by the resultant $Vr'$. The net effect of these two resultants combined is represented by the resultant $Vr''$ indicating the actual relative motion. It will be noted that the resultant of the motion produced by the auxiliary flow $Vr'$ is approximately at right angles to the resultant produced by the main flow.

The uncovering of the horizontal passages of the auxiliary valve permits flow of the fluid into and from pipes 149 and 148 leading to and from the cylinder 119, forcing piston 119' to the left, enabling it to assist in rotation of the distributor valve stem 125. The negative displacement of the tracer arm increases from Z', Fig. 17, up to a point between 19' and 20' where the main and auxiliary valves uncover the remaining vertical and horizontal passages. Rotation of the distributor valve beyond this point causes a rapid increase in the opening of these remaining passages of the main and auxiliary valves which causes a rapidly increasing upward component of the motion $Vv$ produced by the main flow as shown in Fig. 20, aiding materially in changing the direction of the resultant motion upwardly or in a counter clockwise direction requiring a decreasing amount of auxiliary flow and resulting in a decreased amount of negative displacement of the tracer point. When this motion has progressed to a point 21' of Fig. 17, the direction of the resultant motion has changed to 45° above the horizontal, the distributor valve having been rotated to approximately the same amount so that the horizontal and vertical passages of the main and auxiliary valves now have substantially the same amount of openings as shown in Fig. 21. The horizontal and vertical components of motion produced by the main flow are the same and therefore no auxiliary flow is required. The negative displacement of the tracer arm will therefore have been reduced to zero, as is represented on Fig. 17, 21', and consequently the secondary valve is in its neutral position and no flow takes place between it and the auxiliary valve of the distributor valve mechanism. In this case the fluid escaping from the pressure opening of the main valve through passage 144' into the positive opening of the auxiliary valve continues to flow into passage 146' leading back to the exhaust opening of the main valve to the sump. Fluid also escapes from the pressure opening of the main valve through passage 147' to the negative opening of the auxiliary valve and continues to flow from there into passage 145' leading back to the exhaust opening of the main valve and to the sump. The escape of the fluid from the pressure opening of the main valve through the two branches to the exhaust opening reduces the velocity of the horizontal and vertical components of motion produced by the main flow. The amount of these reductions in velocity is represented by $Vh'$ and $Vv'$ as shown on the velocity diagram of Fig. 21. The resultant velocity $Vr$ that would be produced by the main flow at 45° points would be about 41 per cent greater than the horizontal or vertical component would be if the main flow were not by-passed. The by-passing is, however, an advantage as by regulating the amount of this by-passing, the resultant velocity $Vr''$ produced can be regulated within practical limits and can be made just equal to what the horizontal or vertical component of the main flow would be without by-passing. In other words, the resulting velocity $Vr''$ caused by the main flow to both operating cylinders can be made the same as when the main flow occurs in one cylinder only as shown in Figs. 18 and 24. In designing the speed valve the amount by-passed may be properly regulated by suitably proportioning the relative area of the speed valve openings leading from the auxiliary valve to that of the speed valve openings leading from the main valve. By-passing takes place at all 45° points, and to a lesser extent, at a short distance on either side of the 45° points when the auxiliary flow is low. As the resultant velocity produced by the auxiliary flow is always approximately at right angles to the resultant velocity produced by the main flow, the increase or decrease of the magnitude of the resultant relative velocity $Vr''$ caused by the auxiliary flow would be small. Therefore the resultant relative velocity $Vr''$ produced at any angular position of the distributor valve would be approximately the same regardless of whether the main flow occurs through one operating cylinder only or whether the main and auxiliary flow occurs through both operating cylinders or any combination. Therefore, the rate of feed of the machine would be substantially constant throughout the operation notwithstanding wide variations in the shape of the master or the direction of motion of the tracer and cutter in reproducing.

It is my object to be able to so vary the speed of the work across the tool as to keep the tool cutting as far as possible at its maximum capacity. While there will be occasions when, due to very abrupt changes of direction or other causes, the feed may momentarily vary considerably from the substantially constant tangential rate otherwise maintained, nevertheless in general the feed will be substantially constant in a tangential direction. This avoids the disadvantages inherent in other die-sinking machines, wherein the cross feed is performed at a constant rectilinear rate, and the machine must be provided with safety stops to avoid breaking the tool when abrupt changes of direction occur.

Motion continuing beyond the point illustrated in Fig. 21 in a straight line at 45° above the horizontal causes the tracer point to recede from the master and produce a negative displacement causing flow from the auxiliary valve as indicated in Fig. 22. This auxiliary flow produces a resultant $Vr'$ which is approximately at right angles to the resultant $Vr$ produced by the main flow, giving the resultant velocity $Vr''$ of the relative motion imparted to the tracer and cutter, the direction of which is to be changed still further in counter clockwise direction limiting the amount of the negative displacement. The auxiliary flow also branches into the pipes leading to the cylinders 119 and 120 causing further rotation of the distributor valve stem 125. As the motion continues, rotation of the distributor valve stem continues and the negative displacement increases, until at a point, as shown in Fig. 23, when the main and auxiliary valves have almost closed their horizontal and vertical passages respectively. Restriction of the horizontal passages of the main valve causes reduction of the horizontal component $Vh$ of the velocity produced by the main flow while restriction of the vertical passages of the auxiliary valve reduces the vertical component $Vv'$ produced by the auxiliary flow tending to keep the auxiliary resultant $Vr'$ at right angles to the main resultant $Vr$. As this motion continues beyond the point illustrated in Fig. 23, the horizontal and vertical passages of the main and auxiliary valve continue to close, causing still further counter clockwise change in the direction of the resultant motion and a decrease in the amount of negative displacement in the tracer arm until the point 24' of Fig. 17 is reached, corresponding to the arrangement of the valves shown in Fig. 24 when these passages are closed entirely and the negative displacement of the tracer arm has been reduced to zero. At 24' the motion is upward as shown in Fig. 24 and requires flow through the vertical operating cylinder B only. This motion continues until a point C' on the master is reached at which the curve extending to the right begins. When the center of the tracer point reaches the point C'' corresponding to the point C' of the master at which the curve begins, continued motion in an upward direction causes a positive displacement of the tracer point which causes a flow of liquid into the positive opening of the auxiliary valve as shown in Fig. 25. This causes a flow into passage 144' leading to pipe 144 connected with the cylinder A from whence the liquid returns through pipe 145 and passage 145' into the negative opening of the auxiliary valve and from there to the sump. This auxiliary flow causes piston A' to move to the right and produces the horizontal component of the auxiliary flow $Vh'$ as shown on the velocity diagram causing a clockwise change of the direction of the resultant relative motion imparted to the tracer and cutter represented by $Vr''$ which limits the amount of positive displacement of the tracer point.

The flow of fluid into the positive opening of the auxiliary valve causes a flow of fluid to the cylinder 119 causing a clockwise rotation of the distributor valve stem 125. As the motion continues, the positive displacement of the tracer point increases and clockwise rotation of the distributor valve continues until a point between 25' and 26' is reached where the horizontal passages of the main valve and the vertical passages of the auxiliary valve are opened as shown in Fig. 26, giving an added horizontal component of motion V$h$ corresponding to the horizontal main flow produced thereby and a vertical component of motion V$v'$ corresponding to the vertical auxiliary flow produced thereby. This gives a further clockwise change in the direction of the resultant motion with a reduction in the amount of positive displacement of the tracer point. In continuation of this motion the openings in the main and auxiliary valves increase, giving a further clockwise change of the resultant relative motion V$r''$ and a still further reduction of the positive displacement until a point 27' is reached where all four openings of the main and auxiliary valves are substantially the same, giving a motion at 45° from the vertical as shown in Fig. 27 with the positive displacement of the distributor point reduced to zero.

The further action of the machine in following the outline of the master shown would be the same as that described, the only difference being in the actual directions involved. The motion would be continued until some point R'', Figs. 1 and 17, was reached at the end of the cut at which point hand lever 142 would be turned to the left and the cutter would be advanced, upwardly or downwardly as the case may be, by means of the lead screw 143. Turning of the hand lever 142 to the left causes the reversing valves R, $r$ and $r'$ to reverse the flow of liquid leading to and from the upper or main section of the distributor valve, small cylinder 119 and small cylinder 120 respectively causing a reversal of the direction of motion of the tracer and cutter which causes them to move to the left and back over the master again. The motion in this case would be in a reverse direction to that shown by the indicator on top of knob 140.

The operation of the machine in the reverse direction is shown diagrammatically in Figs. 28 and 29 at the two positions 28' and 29' of Fig. 17, which show the effect of a negative and a positive displacement respectively in controlling the direction of the resultant motion when operating in the reverse direction. In this case flow of liquid from the pressure tank T is directed by the reversing valve R, Fig. 14, into pipe 14 leading to the $e$ opening, Fig. 16, of the main valve. At position 28', this causes flow into pipe connection 145, as shown in Fig. 28, which leads to the right hand end of cylinder A causing a movement to the left of piston A' the return being through pipe connection 144 leading to the $p$ opening of the main valve, which directs the flow through pipe 13 leading to reversing valve R which now directs it to the sump through pipe 12'. The motion of piston A' produces the horizontal component V$h$ to the left as shown on the velocity diagram. At position 28' the tracer point would be displaced negatively, as shown on Fig. 17, which would cause a flow of liquid into the negative opening of the auxiliary valve. From thence it flows into passage 147' leading to pipe 147 which connects with the top of cylinder B causing a downward motion of piston B', the return being through pipe connection 146 leading to passage 146' and from there to the positive opening of the auxiliary valve from whence it returns to the sump. The downward motion of piston B' causes a relatively upward motion of the tracer and cutter, having a component V$v'$ which combined with the horizontal component V$h$ gives the resultant motion V$r''$ as required.

Flow of liquid into the negative opening of the auxiliary valve also causes flow into pipe connection 150 which is now directed by the small reversing valve $r'$ into pipe 151' leading to the top of the small cylinder 120, causing piston 120' to move downwards. The flow returns through pipes 150' and 151 to the positive opening of the auxiliary valve and from there to the sump. This downward motion of piston 120' causes a slow clockwise rotation of the distributor valve stem as is required. At position 29' flow from and to the $e$ and $p$ openings respectively of the main valve will cause an upward component of motion V$v$ to the tracer and cutter as shown by the velocity diagram of Fig. 29, while flow from and to the positive and negative openings respectively of the auxiliary valve, caused by the positive displacement of the tracer point as indicated by the dotted line at 29' of Fig. 17, will cause a horizontal component of motion V$h'$ to the left of the tracer and cutter as shown on the velocity diagram which combined with the vertical component V$v$ will give the resultant motion V$r''$ as required. Flow of liquid from and to the positive and negative openings respectively of the auxiliary valve will cause through motion of piston 119' as shown in Fig. 29, a slow counter clockwise rotation of the distributor valve stem as required. The further action of the machine in following the master to the point R', Figs. 1 and 17, at the end of the cut where the motion would be reversed again would be the same as has been described. The direction of motion of tracer and cutter would be reversed by means of the hand reversing lever 142 and the cutter advanced either upwardly or downwardly by means of the lead screw 143 at the end of each cut at the right hand and left hand ends of the master at points R'' and R' respectively until the entire working surface of the master has been covered in order to finish the work.

It will be readily seen that the action of this machine at all times is such that in describing any outline, the relative motion of the tracer with respect to the master or pattern is in a direction approximately tangent to the surface of the master at the point of contact with the tracer point or approximately at right angles to an imaginary line passing through the center of the tracer roll and the point of contact of the same with the master and that any relative motion between the two which causes any displacement of the tracer point from its neutral position will immediately cause a combined responsive action of the primary and secondary valve in connection with the distributor valve and an immediate change in the direction of the resultant relative motion between the two, such as would limit the displacement of the tracer point, and that the resultant gradual rotation of the distributor valve stem would eventually give whatever change in relative motion that is required and cause the tracer point to return to its neutral position. This action enables the machine to automatically follow the master or pattern at a predetermined constant feed and to describe any conceivable shape or contour that can be cut by a rotating cutter.

I claim:

1. In a hydraulically operated die-sinking machine, the combination of a master, a movable support therefor, the work also being mounted on said support, a hydraulic cylinder connected to said support, a carriage, a second hydraulic cylinder connected to said carriage, a tracer, a cutter, a carrier on said carriage for said tracer and said cutter, a hydraulic system controlled by said tracer for controlling the pistons of said cylinders, and means for reversing the directional effectiveness of the hydraulic system and controls therefor as respects a given tracer movement.

2. In a hydraulically operated die-sinking machine, the combination of a master, a movable support therefor, the work also being mounted on said support, a hydraulic cylinder connected to said support, a carriage, a second hydraulic cylinder connected to said carriage, a tracer, a cutter, a carrier on said carriage for said tracer and said cutter, a hydraulic system controlled by said tracer, and means in said system for determining the distribution of actuating fluid to said cylinders, and means for effecting relative movement between said carrier and said carriage.

3. In a hydraulically operated die-sinking machine, the combination of a master, a movable support therefor, the work also being mounted on said support, a hydraulic cylinder connected to said support, a carriage, a second hydraulic cylinder connected to said carriage, a tracer, a cutter, a carrier on said carriage for said tracer and said cutter, a hydraulic system controlled by said tracer for controlling said cylinders, hand-operated means for reversing the directional effectiveness of the hydraulic system as respects the control of the cylinders in response to a given tracer movement, and separate hand-operated means for moving said carrier step by step on said carriage.

4. In a machine of the character described, the combination of a master, a tracer, a cutter, and a power train means for co-ordinating the master with the tracer, said means including in its train a variable interposer whose position is controlled by the tracer.

5. In a machine of the character described, the combination of a master, a tracer, a cutter, and a power train means for co-ordinating the master with the tracer, said means including a variable interposer, connections between said interposer and said tracer, and a movable element acting on said interposer to variably shift the train in accordance with the positions of the interposer.

6. In a hydraulically operated machine of the character described, the combination of a master, a tracer, a cutter, and means for co-ordinating the master with the tracer, said means including a connector variably controlled by said tracer, a hydraulic system including a primary valve, and an element movable independently of said system for operating said valve, said connector being interposed between said element and said valve.

7. In a machine of the character described, the combination of a master, a tracer, a cutter, and means for co-ordinating the master with the tracer, said means including a connector variably positioned by said tracer, and a motor driven reciprocatory element co-active with said connector and through it controlling the effective position of said cutter with respect to the work to be operated on thereby.

8. In a hydraulically operated machine of the character described, the combination of a master, a tracer, a cutter, and means for co-ordinating the master with the tracer; said means including a variably positionable connector, connections between said connector and said tracer, a movable element variably coactive with said connector, and hydraulic devices for determining the relative effective positions of said cutter and the work to be operated on thereby, said hydraulic devices being controlled by said movable element.

9. In a hydraulically operated machine of the character described, the combination of a master, a tracer, a cutter, a movable element reciprocated independently of the hydraulic system, a hydraulic distributor valve mechanism for directing the flow of fluid pressure to control the cutting operation in accordance with the contour of said master, and an abutment device variably interposed by said tracer between the movable element and the valve mechanism, said valve mechanism being variably effected by said movable element in accordance with its co-action with said abutment device.

10. In a hydraulically operated machine of the character described, the combination of a master, a tracer, a cutter, a reciprocating element motivated independently of the hydraulic operation, an abutment device variably positioned by said tracer, and a hydraulic system for guiding said cutter, said device being interposed between said element and the hydraulic system, and said hydraulic system being controlled by said element through said device and including a distributor valve mechanism for directing the flow of fluid pressure to control the cutting operation, a primary valve mechanism, and a secondary valve mechanism controlled by said primary valve mechanism and operating to actuate said distributor valve mechanism.

11. In a hydraulically operated machine of the character described, the combination of a master, a tracer, a cutter, a reciprocating element motivated independently of the hydraulic operation, an abutment device variably positioned by said tracer, and a hydraulic system for guiding said cutter, said device being interposed between said element and the hydraulic system, said hydraulic system being controlled by said element through said device and including a distributor valve mechanism for directing the flow of fluid pressure to control the cutting operation, a primary valve mechanism, and a secondary valve mechanism controlled by said primary valve mechanism and operating to actuate said distributor valve mechanism, the displacements of said secondary valve mechanism magnifying displacements of said primary valve mechanism.

12. In a hydraulic machine of the character described, the combination of a master, a tracer, a cutter, and means for co-ordinating the master with the tracer, said means including a motor-driven reciprocating element, a hydraulic system for co-ordinating the master and tracer, said hydraulic system including a distributive valve mechanism for directing the flow of fluid pressure to control the cutting operation, and primary valve mechanism for actuating said distributor valve mechanism, said primary valve mechanism being subject to variable control by said motor-driven reciprocating element.

13. In a machine of the character described, the combination of a master, a tracer, a cutter, and means for co-ordinating the master with the tracer, said means including a mechanical controlling device and positive trains of connections between said tracer and said device, one of said trains being operative by the tracer point during axial movements in and out relatively to the face of the master and the other of said trains being operative by angular movements of the tracer point.

14. In a machine of the character described, the combination of a master, a tracer, a cutter, and means for co-ordinating the master with the tracer, said means including a controlling device movable into different positions for effecting different movements of the parts controlled thereby, a carrier for said device, a tracer bar having a universal mounting and in which the tracer point is independently movable, operative connections between said tracer bar and said carrier for movement of the controlling device, and additional operating connections between the tracer point itself and said carrier for effecting movement thereof independent of the movement of the tracer bar.

15. In a hydraulic machine of the character described, the combination of a tracer mechanism, a cutter, a support on which the tracer mechanism and cutter are mounted, a master, a second support on which the master and the workpiece are mounted, means for effecting relative movements of said supports towards and away from each other, hydraulic means for relatively moving said supports transversely of each other, and hydraulic means for controlling both said previously recited means operative by displacements of the tracer point through contact with the master.

16. In a machine of the character described the combination of a master and tracer supported for universal relative movement one with respect to the other, of means for effecting said movement, and means for automatically controlling the movement effecting means, said latter means including a variably positionable connector controlled by the tracer, a power driven element for coaction with said connector in its several adjusted positions, and operative connections between the connector and the means for effecting relative movement of the parts for varying the operative effect of the latter in accordance with variations in position of the connector.

17. In a profiling or die sinking machine of the character described the combination with a master and tracer disposed in co-operative relation one to the other for universal relative movement in a given plane, of a cutter and work support mounted for relative movement in correspondence with the relative movements of the master and tracer, power operated devices for effecting the relative movements of the parts in the component directions necessary to produce said universal relative movement, means for controlling the distribution of actuating power to said power operated devices for determination of the resultant movement, said means including a shifter, a power actuator therefor, and a tracer controlled connector for varying the operative relationship of the shifter and its power actuator.

18. In a hydraulically operated machine of the character described the combination with a master and a tracer mounted for universal relative movement in a given plane, of a cutter and work support associated with said parts for relative movement in correspondence with the relative movements of the master and tracer, hydraulic means for effecting the necessary component movements to produce the resultant desired path of relative movement of the master and tracer, distributive valve mechanism for directing the flow of fluid pressure to the units for effecting said movements, a shiftable member for determining the effective position of the distributive valve mechanism, power means for effecting movements of the shiftable member, and means connected with and operable by movement of the tracer for varying the amount of shifting of the member effected by a given actuation of the power device.

19. In a hydraulically operated machine of the character described the combination of a master and a tracer mounted for relative movement in a non-uniform path determined by the contour of the master, of a cutter and work support mounted for movement with respect to each other in a corresponding path, and hydraulically actuable devices for effecting the relative movement of the parts including a distributive valve mechanism for directing the flow of fluid pressure to cause the movement to coincide with the predetermined path, additional valve mechanism for actuating said distributive valve mechanism, a connector coupled with and variably positioned by the tracer, and a movable element co-acting with the connector in its variable positionings for determining the operation of said additional valve mechanism.

20. An actuator for a hydraulic circuit control valve including a shifter, a vibrator, means for effecting a variable coupling of the shifter and vibrator, a tracer, and connections between the tracer and said means for automatically varying the coupling in accordance with the position of the tracer.

21. A mechanism of the character described including a hydraulic operating circuit, a control valve for said circuit, a variably effective pulsator for producing intermittent shifting movements of the valve, and a hydraulic locking mechanism operative intermediate valve shifting pulsations for maintaining the valve in pre-shifted position.

22. A mechanism of the character described including a hydraulic operating circuit, a control valve for said circuit, a variably effective pulsator for producing intermittent shifting movements of the valve, a hydraulic locking mechanism operative intermediate valve shifting pulsations for maintaining the valve in pre-shifted position, and additional hydraulic mechanism for reversely shifting the valve when same is released by the pulsating mechanism.

23. A mechanism of the character described including a hydraulic operating circuit, a control valve for said circuit, a variably effective pulsator for producing intermittent shifting movements of the valve, a hydraulic locking mechanism operative intermediate valve shifting pulsations for maintaining the valve in pre-shifted position, and additional hydraulic mechanism for reversely shifting the valve when same is released by the pulsating mechanism, said pulsating mechanism including a pattern operable tracer, and means effective on movement of the tracer for varying the valve operating effect of individual pulsations.

24. In a mechanism of the character described the combination with a hydraulic operating circuit, of control means therefor, including a shiftable valve member, a valve controlling circuit, a pulsator, and means rendering the control circuit and pulsator effective as respects the valve in predetermined recurrent cyclic sequence.

25. A control mechanism for a hydraulic circuit including a shiftable valve member, means tending to resiliently urge the valve in one direction, means adapted to effect a hydraulic urge of the valve in the opposite direction, a variable mechanical actuator for positively shifting the valve in its resiliently urged direction, and an intermittently effective hydraulic locking system selectively effective to secure the valve against movement in the direction of its hydraulic urge or to permit said movement thereof.

26. A control mechanism for a hydraulic circuit including a shiftable valve member, means tending to resiliently urge the valve in one direction, means adapted to effect a hydraulic urge of the valve in the opposite direction, a variable mechanical actuator for positively shifting the valve in its resiliently urged direction, an intermittently effective hydraulic locking system selectively effective to secure the valve against movement in the direction of its hydraulic urge or to permit said movement thereof, and tracer controlled means for automatically varying the operative effect of the mechanical shifting means as respects degree of valve movement thereby.

27. A tracer controlled mechanism for use in connection with profiling and die sinking machines or the like comprising in combination with the power actuating mechanism of the machine, a control device therefor movable into different effective positions, a tracer having an angularly and axially movable tracer point, a first series of operative connections actuable by axial movement of the tracer point for adjustment of the control device, and a second series of connections operable by angular movement of the tracer point for adjusting the position of said control device.

28. A tracer controlled mechanism for use in connection with profiling and die sinking machines or the like comprising in combination with the power actuating mechanism of the machine, a control device therefor movable into different effective positions, a tracer having an angularly and axially movable tracer point, a first series of operative connections actuable by axial movement of the tracer point for adjustment of the control device, a second series of connections operable by angular movement of the tracer point for adjusting the position of said control device, and means for independently adjusting the operative effect of each of said series of connections as respects the control device.

29. In a hydraulically operated machine of the character described the combination of a master, a tracer having a tracer point for engagement with the master, a cutter, and means for co-ordinating the master with the tracer including a hydraulic operating system, a control device therefor, and individual motion transmitting trains from the tracer to the control device respectively operable thereon on axial and on angular movements of the tracer point.

30. In a hydraulically operated machine of the character described the combination of a master, a tracer having a tracer point for engagement with the master, a cutter, and means for co-ordinating the master with the tracer including a hydraulic operating system, a control device therefor, individual motion transmitting trains from the tracer to the control device respectively operable thereon on axial and on angular movements of the tracer point, and means for effecting a variation in the sensitivity of the tracer point as respects angular and axial displacements thereof.

31. In a hydraulically operated machine of the character described the combination of a master, a tracer having a tracer point for engagement with the master, a cutter, and means for co-ordinating the master with the tracer including a hydraulic operating system, a control device therefor, individual motion transmitting trains from the tracer to the control device respectively operable thereon on axial and on angular movements of the tracer point, and means establishing a differential of resistance of the tracer point to angular and lateral deflections.

32. A tracer controlled mechanism for die sinking and profiling machines or the like including a tracer head, a lever mechanism associated therewith including a control member movable by oscillations of the lever for determining the operative effect of the machine, a tracer bar mounted in the head for universal movement and having a tracer point axially shiftable with respect to the bar, a plunger actuable by angular movement of the bar for effecting oscillation of the lever, and additional linkage coupled with the tracer point and actuated by axial movement thereof for effecting independent oscillation of the lever.

33. In a hydraulically operated machine of the nature described the combination with an associated master and work support and an associated tracer and cutter, of hydraulic means for effecting relative movement of the parts in a path determined by the effective contour of the master as engaged by the tracer, means for automatically controlling the flow of hydraulic actuating medium to effect the desired movements including a distributive valve system, auxiliary hydraulic mechanisms for determining the effective positionings of the valve mechanism of the distributive valve system, means operable by deflection of the tracer for determining the hydraulic activation of the auxiliary hydraulic mechanism, and means for reversing the responsive effect of said mechanisms as respects a given deflection of the tracer.

34. In a hydraulically operated machine of the nature described the combination with an associated master and work support and an associated tracer and cutter, of hydraulic means for effecting relative movement of the parts in a path determined by the effective contour of the master as engaged by the tracer, means for automatically controlling the flow of hydraulic actuating medium to effect the desired movements including a distributive valve system, auxiliary hydraulic mechanisms for determining the effective positionings of the valve mechanism of the distributive valve system, means operable by deflection of the tracer for determining the hydraulic activation of the auxiliary hydraulic mechanism, means for reversing the responsive effect of said mechanisms as respects a given deflection of the tracer, and additional means for reversing the hydraulic effect of the main actuating system independent of the adjustment of the distributive control valve mechanism.

35. In a hydraulically operated machine of the nature described the combination with an associated master and work support and an associated tracer and cutter, of hydraulic means for effecting relative movement of the parts in a path determined by the effective contour of the master as engaged by the tracer, means for automatically controlling the flow of hydraulic actuating medium to effect the desired movements including a distributive valve system, auxiliary hydraulic mechanisms for determining the effective positionings of the valve mechanism of the distributive valve system, means operable by deflection of the tracer for determining the hydraulic activation of the auxiliary hydraulic mechanism, means for reversing the responsive effect of said mechanisms as respects a given deflection of the tracer, additional means for reversing the hydraulic effect of the main actuating system independent of the adjustment of the distributive control valve mechanism, and means coupling the several reversing mechanisms aforesaid whereby simultaneous corresponding actuation thereof may be effected.

36. A machine of the character described including angularly related hydraulic control cylinders containing pistons individual thereto, a distributive valve system for determining effective operative distribution of actuating fluid selectively to one or the other or both of said cylinders for desired separate or joint actuation of the pistons thereof to attain desired resultant movement, means for supplying hydraulic actuating fluid to the distributive valve system for effecting pressure in one part of the system and return flow in the opposed portion of the system, and means operable at will for reversing the characteristics of the two sides of the system and thus the operative effects of the individual cylinders during joint or several operation thereof.

37. A machine of the character described including angularly related hydraulic control cylinders containing pistons individual thereto, a distributive valve system for determining effective operative distribution of actuating fluid selectively to one or the other or both of said cylinders for desired separate or joint actuation of the pistons thereof to attain desired resultant movement, means for supplying hydraulic actuating fluid to the distributive valve system for effecting pressure in one part of the system and return flow in the opposed portion of the system, means operable at will for reversing the characteristics of the two sides of the system and thus the operative effects of the individual cylinders during joint or several operation thereof, additional control cylinders containing control pistons for effecting variable positioning of the distributive valve system, and means for individually reversing the characteristics of the hydraulic lines coupled with said control cylinders.

38. In a hydraulically operated die-sinking machine, including means for supporting a work piece and a master as a first pair in predetermined relative position, and additional means for supporting a tool in opposition to the work piece and a tracer body in opposition to the master as a second pair, a hydraulic motor for effecting a movement of one of said pairs in a direction toward or away from the other pair, a second hydraulic motor for effecting movement of one of said pairs transversely with respect to the other pair, hydraulic valve means for controlling the operation of said hydraulic motors, a tracer point for engagement with the master, means mounting the tracer point in the tracer body for universal movement whereby on contact with the master it may be displaced in any direction from its normal position, and operative connections between the tracer point and the hydraulic valve means whereby deflection of the tracer point relative to the tracer body energizes said hydraulic valve means to keep the tracer point and master in contact one with the other and thus cause the relative path of movement between cutter and work to conform with the shape of the master.

GILBERT V. ANDERSON.